(12) United States Patent
Angelov

(10) Patent No.: US 8,250,004 B2
(45) Date of Patent: Aug. 21, 2012

(54) MACHINE LEARNING

(75) Inventor: Plamen Angelov, Lancaster (GB)

(73) Assignee: Lancaster University Business Enterprises Ltd., Lancaster (GB)

( * ) Notice: Subject to any disclaimer, the term of this patent is extended or adjusted under 35 U.S.C. 154(b) by 632 days.

(21) Appl. No.: 12/447,859

(22) PCT Filed: Oct. 23, 2007

(86) PCT No.: PCT/GB2007/004047
§ 371 (c)(1),
(2), (4) Date: Sep. 28, 2009

(87) PCT Pub. No.: WO2008/053161
PCT Pub. Date: May 8, 2008

(65) Prior Publication Data
US 2010/0036780 A1    Feb. 11, 2010

(30) Foreign Application Priority Data

Nov. 1, 2006 (GB) .................................. 0621734.3
Jul. 13, 2007 (GB) .................................. 0713632.8

(51) Int. Cl.
*G06N 5/00* (2006.01)
(52) U.S. Cl. ........................................... 706/12; 706/45
(58) Field of Classification Search .................. 706/12, 706/45
See application file for complete search history.

(56) References Cited

FOREIGN PATENT DOCUMENTS

| | | |
|---|---|---|
| EP | 0 436 312 | 7/1991 |
| EP | 0 521 643 | 3/1997 |
| JP | 2002-196929 | 7/2002 |

OTHER PUBLICATIONS

Henning, et al., Model-based Semantic Conflict Analysis for Software and Data-Integration Scenarios, Technische Universitat Berlin, Mar. 5, 2009, pp. 1-95.*
Provost et al. "Scaling Up: Distributed Machine Learning with Cooperation." Proceedings of the National Conference on Artificial Intelligence, Menlo Park, CA: AAAI Press, 1996.
International Search Report dated Jan. 16, 2009 in PCT Application No. PCT/GB2007/004047.
Written Opinion dated Jan. 16, 2009 in PCT Application No. PCT/GB2007/004047.
International Search Report in Patent Application No. PCT/GB2007/004047 dated Mar. 19, 2009.
Provost et al. "Scaling Up: Distributed Machine Learning with Cooperation." Proceedings of the Thirteenth National Conference on artificial Intelligence and the Eighth Innovative Applications of Artificial Intelligence Conference, MIT Press, Cambridge, MA, vol. 1, 1996.

* cited by examiner

*Primary Examiner* — Wilbert L Starks
(74) *Attorney, Agent, or Firm* — Beyer Law Group LLP

(57) ABSTRACT

Computer implemented machine learning methods are described. A co-operative learning method involves a first rule based system and a second rule based system. A rule base is generated from input data and recursion data is used to recursively update the rule base as a result of newly received input data. Rule data defining at least one rule and associated data are sent to the second system which determines whether to update its rule base using the transmitted rule data, and if so the recursion data is used to recursively determine the updated rules for its rule base. A father machine learning method for a rule based system, involves receiving time series data, determining whether the data increases or decreases the spatial density for previously existing rules, and if so then creating a new cluster and associated rule, otherwise a new cluster is not created.

27 Claims, 8 Drawing Sheets

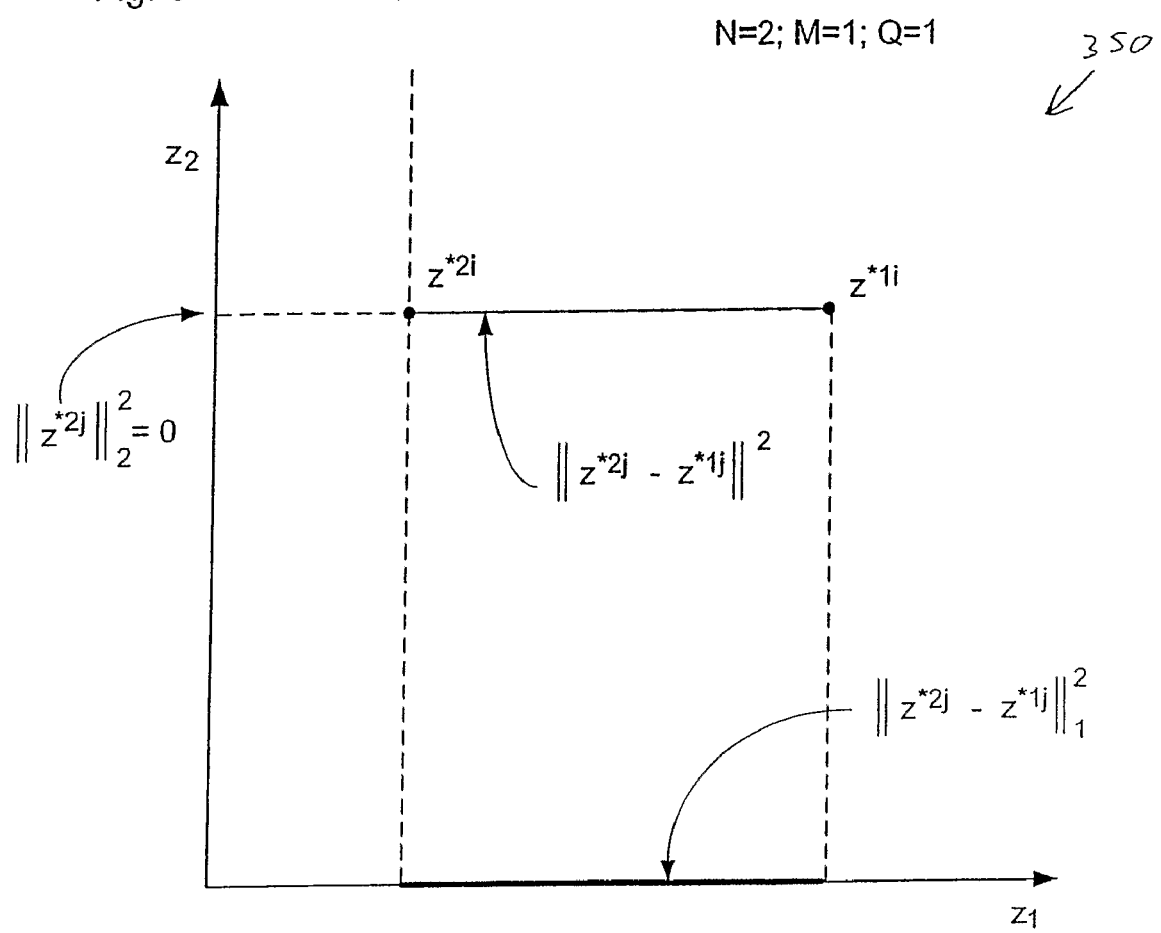

MACHINE LEARNING

The present invention relates to machine learning and also to co-operative machine learning in which two entities can interact so that the learning of a first entity can be used by a second entity.

Fuzzy rule-based systems have been proposed in the 1970s and 1980s and are currently used in many control, prediction, classification, fault detection, and other applications as described, for example, in Essentials of Fuzzy Modelling and Control, Yager R R and D P Filev, 1994, John Wiley and Sons, NY, USA.

The design of fuzzy rule-based systems was initially based on expert knowledge. Since the 1990s data-driven approaches have been developed and proposed to design fuzzy rule-based systems. The design of a system generally includes identification of its structure (e.g. fuzzy sets, fuzzy rules, type and number of rules, fuzzy sets per rule, consequents of the rules) as well as its parameters (primarily parameters of its consequent part). Most approaches are applicable off-line and require a batch set of data to be available beforehand.

An approach for fuzzy rule-base adaptation using on-line clustering has been described by the inventor and published in International Journal of Approximate Reasoning 35 (2004) 275-289. The described approach uses on-line clustering of the input-output data with a recursively calculated spatial proximity measure. Centres of the clusters are used as prototypes of the centres of the fuzzy rules. A recursive algorithm makes it possible to design an evolving fuzzy rule-base in on-line mode, which adapts to the variations of the data pattern. However, this approach is limited to a single system and does not provide for co-operative learning between multiple systems.

It is difficult to engineer systems which have a high level of adaptability to their environment as experienced via changing input data patterns. This is particularly the case in advanced manufacturing, robotics, communication systems and defence applications, but is not limited to such applications.

Existing standalone systems can be described as "adaptive" in the sense that they usually incorporate a parameterised system model. However, more fully adaptive systems need to adapt not only in terms of parameters of an existing system, but also more substantively in the rule base underlying the system structure in response to patterns in the data space defining the system. Examples of standalone systems are described in UK patent publication number 2350695 and "An Approach to on-line identification of evolving Takagi-Sugeno models" IEEE Transactions on Systems, Man and Cybernetics, part B, vol. 34, No 1, pp. 484-498, which are incorporated by reference herein.

The present invention provides a more computationally efficient machine learning method which can be used by a single standalone system or by co-operating system.

The concept of potential increment or variance, based on how a new data point changes the spatial density of data points about the centres of all previously existing clusters/rules, is used to reduce the computational burden. Compared to previous approaches, the use of potential increment eliminates the need to recalculate recursively the potential of each rule centre as well as the potential of each new data point. Instead, the mean of all data is recursively updated and the mean is reduced by the value of each rule/cluster centre. This makes the computation much simpler, eliminates the need to normalize the data in the range 0 to 1 and also reduces the amount of data that needs to be stored. Also, when used in a co-operative application, the amount of data that needs to be transmitted between learning processes is also reduced.

According to a first aspect of the invention, there is provided a computer implemented method for machine learning by a first entity supporting a rule based system, wherein each rule is associated with a centre of a cluster of data points in a combined rule input and rule output data space. The method can comprise receiving a time series data item as input. Then it is determined whether a data point for the time series input data item increases or decreases the spatial density for each previously existing rule. If the data point does increase or decrease the spatial density for every previously existing cluster, then a new cluster and associated rule is created. Otherwise, if the data point does not increase the spatial density for every previously existing cluster, or does not decrease the spatial density for every previously existing cluster, then a new cluster is not created. The method is repeated for a next time series data item received.

This general approach has a number of advantages over other approaches. It provides a computationally simpler condition for determining whether to create or establish a new cluster/rule (fuzzy rule-base evolution) based on eqs. (12)-(13) detailed below. This obviates the need to calculate the potential of each new point as per eq. (6) below or to use a recursive formula, for example as described in Angelov P., D. Filev, *An Approach to On-line Identification of Takagi-Sugeno Fuzzy Models*, IEEE Transactions on System, Man, and Cybernetics, part B—Cybernetics, vol. 34, No 1, 2004, pp. 484-498. Consequently, the need to divide by real numbers is removed (which is a computationally non-trivial operation, especially when implementing the invention on hardware and in 'real-time'). Also, there is no need to normalize the data as the value of the potential is not used directly.

Also, there is no need to update the potential of each rule as per the method described in Angelov P., D. Filev, *An Approach to On-line Identification of Takagi-Sugeno Fuzzy Models*, IEEE Transactions on System, Man, and Cybernetics, part B—Cybernetics, vol. 34, No 1, 2004, pp. 484-498.

Further, the possible problems related to comparison of values that are the result of inverses (as the potentials are the inverse of a sum of distances) are avoided (e.g. to compare 0.6666 with 0.6667) as a result of the above comparison.

The invention means that a smaller size of memory can be used compared to other approaches. There is no need to memorize the potential of the centres, nor recursively calculated partial sums (beta and sigma as mentioned in Angelov P., D. Filev, *An Approach to On-line Identification of Takagi-Sugeno Fuzzy Models*, IEEE Transactions on System, Man, and Cybernetics, part B—Cybernetics, vol. 34, No 1, 2004, pp. 484-498, equation 20). Also, instead of updating N values of the potentials of the centres, it is only necessary to update a single value of the overall mean.

The method can further comprise calculating a mean position in the data space of all previous data points. The mean position can be used in determining whether the data point for the time series input data item increases or decreases the spatial density.

When used in a co-operative learning application, only a small number of variables need to be transmitted. The parameters to be transmitted that concern the recursive least squares based estimation are the same, but fewer parameters for the clustering part of the algorithm can be transmitted.

The mean of all data (if standardized as shown on p. 10 of the specification after eq. (1)) asymptotically tends to zero (when k tends to infinity or a large number). In that case, the main condition, eq. (12) can be further simplified which in essence means that new rules are created only for points that are expanding the area covered by the current rules/clusters to areas with higher concentration of data or areas that have not been covered before.

Equation 24 below provides for the update of the spread/radius of the clusters which ensures adaptive size of the clusters and better results.

The method can and further comprises recursively recalculating a measure of the spread or radius of each cluster in the data space. The measure of the spread or radius of each cluster can be used to determine whether the point is sufficiently distant from each previously existing cluster.

The condition for the removal of clusters/rules that are described well by the new rule improves the interpretability which leads to simpler, more transparent and understandable models.

Determining whether the data point for the time series input data item increases or decreases the spatial density of data points for all previously existing clusters can include determining whether the sum of the number of increases of spatial density or decreases of spatial density for every previously existing cluster is equal to the number of previously existing cluster centres or rules.

The present invention also takes existing standalone systems practice and develops it into a much more powerful tool which provides co-operation between systems which interact from time to time in order to transfer data allowing the systems to learn from each other.

In this aspect of the invention, co-operating systems each analyse incoming data and are able to co-operate by exchanging small finite sets of meta-data encapsulating their experience within their individual data environments. This small data exchange allows the set of systems to operate in a more computationally efficient and safer manner. The invention does not require the exchange of all incoming environmental data in order for the systems to learn effectively from each other.

According to a second aspect of the invention, there is provided a computer implemented method for co-operative learning by at least a first entity supporting a first rule based system and a second entity supporting a second rule based system. The first entity can generate a rule base from input data supplied from at least one input. Data can be used to update the rule base as a result of newly received input data. The first entity can sending rule data defining at least one rule of the rule base of the first entity and the data used to update the rule base to the second entity. The second entity can determine whether to update its rule base using the transmitted rule data, and if so then use the transmitted rule updating data to determine the updated rules for its rule base.

Hence, the second entity can learn from the experience of the first entity and continue to learn from its own input data.

Preferably, the rule base is recursively updated and the transferred data can be recursion data used to allow the rule base to be recursively updated.

Updating the rule base can include adding or absorbing a transferred rule to an existing rule or creating a new rule based on the transferred rule.

Determining whether to update the rule base of the second entity can includes forming a joint data space for the first system and the second system. Distances or separations of points representing the combined inputs/outputs or inputs or outputs for rules in the joint data space can be used to help determine whether and/or how to update the rule base of the second entity. The separation in the joint data space of the inputs for a transferred rule and the separation in the joint data space for the outputs for the transferred rule can be determined. The separations can be used to determine whether to absorb the rule, reject the rule or create a new rule.

The method can further comprise determining whether the first entity and the second entity have the same dimensions, and if not then determining a partial separation in a joint data space. Whether to update the rule base can then be based on the partial separations. The partial separations can be used to determine whether to absorb the rule, reject the rule or create a new rule.

The transferred or recursion data can include data representing the mean of all data and the number of data samples/points that were presented to the first entity.

Associated data transferred with the rule data can comprise parameters of the consequents that can be used to continue learning from the transmitted rule. The associated data can further comprise at least one indicator of the quality of the rules. The at least one indicator can include at least one of: age; support; utility; and local potential. The associated data can further comprise initialisation parameters. The associated data can further comprise auxiliary parameters for continuing clustering by the second entity.

The second entity can send rule data defining the rules of the rule base of the second entity and associated data, including recursion data, to a further entity or a plurality of entities. The further entity can be the first entity or the first entity can be one of the plurality of entities. Hence, the first entity or other entities can also learn from the second entity.

The second entity can receive rule data and/or recursion data and/or associated data, from a further entity or a plurality of further entities. Hence, the second entity can learn from another entity, or other entities, as well as from the first entity.

The first entity can send rule data defining at least one rule of the rule base of the first entity and associated data, including the recursion data, to a plurality of different entities each supporting a rule based system. Hence, entities other than the second entity can also learn from the first entity.

The first and/or the second entity can generate an output using the current rules of its rule base. The output can be data or a signal representing a prediction, classification, clustering or control. The data or signal can be output to a device or apparatus for use by the device or apparatus, for example, for processing, display or control by the device or apparatus.

The first and/or second entity can receive data or a signal from a device or apparatus as its input data. The signal or data can generate time series data which is input to the first and/or second entity. The first and second entity can receive different signals and/or data as inputs. The first entity and second entity can receive data and signals from different sources as their respective inputs.

A further aspect of the invention provides computer program code which is executable by at least a first data processing device to carry out any of the method aspects of the invention. Separate sets of computer program code can be provided for the first entity and for the second entity to implement the respective operations carried out by the entities. The separate sets of computer program code can be executable by different data processing devices.

A further aspect of the invention provides at least a first computer readable medium bearing computer program code according to the preceding aspect of the invention. A separate computer readable medium can be provided for each of the entities involved in the method of the invention.

According to a further aspect of the invention, there is provided a data processing system providing co-operative learning by at least a first entity supporting a first rule based system and a second entity supporting a second rule based system. The data processing system can include at least a first data processing device and at least a first storage device in communication therewith and storing instructions which can configure the data processing device to cause: the first entity to generate a rule base from input data supplied from at least one input and to calculate recursion data which can be used to recursively update the rule base as a result of newly received input data; the first entity to send rule data defining at least one rule of the rule base of the first entity and associated data, including the recursion data, to the second entity; and the second entity to determine whether to update the rule base of the second entity using the transmitted rule data, and if so then to use the recursion data to recursively determine the updated rules for its rule base.

The data processing system can include: a first data processing apparatus which includes the first data processing device and the first storage device and which hosts the first entity; and a second data processing apparatus which includes a second data processing device and a second storage device in communication therewith and storing instructions which can configure the second data processing device, and which hosts the second entity.

The first data processing apparatus and the second data processing apparatus can be separate apparatus. The first apparatus and second apparatus can be in communication via a communication link via which the rule data and associated data can be sent between the first entity and the second entity. The communication link can be a permanent or continuous link or a temporary, occasional or intermittent link. The communication link can be wired or wireless, and can be in the form of a network.

A further aspect of the invention provides a data processing system providing machine learning by an entity supporting a rule based system, the data processing system including at least a first data processing device and at least a first storage device in communication therewith and storing instructions which can configure the data processing device to: receive a time series data item as input; determine whether a data point for the time series input data item increases or decreases the spatial density for each previously existing rule; if the data point does increase or decrease the spatial density for every previously existing cluster, then creating a new cluster and associated rule, otherwise, if the data point does not increase the spatial density for every previously existing cluster, or does not decrease the spatial density for every previously existing cluster, then not creating a new cluster; and repeat the method for a next time series data item received.

Embodiments of the present invention will now be described in detail, by way of example only, and with reference to the accompanying drawings, in which.

Figure 1:
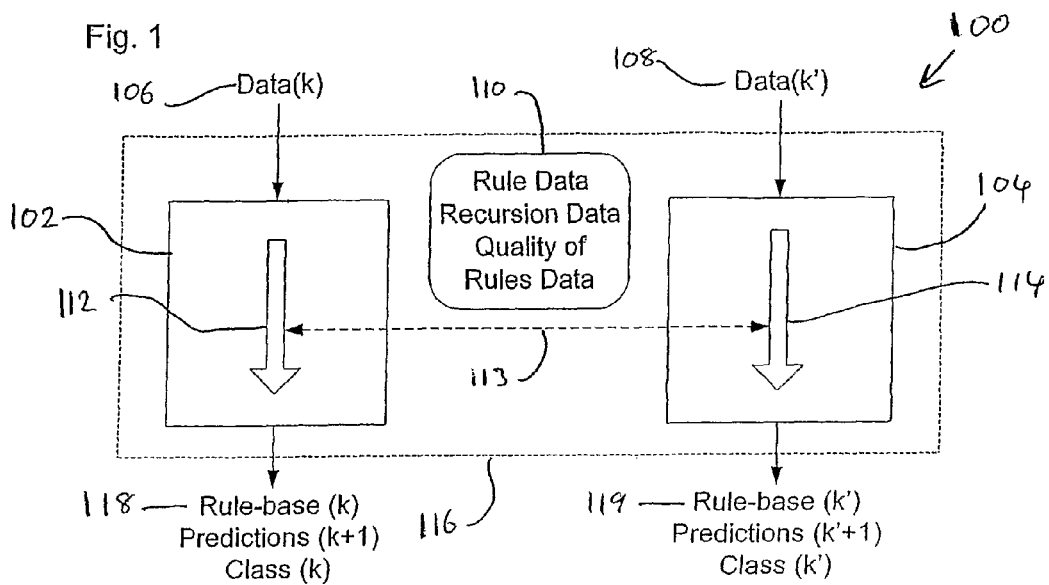
FIG. 1 shows a schematic block diagram of a co-operative learning system according to the present invention.
Figure 2:
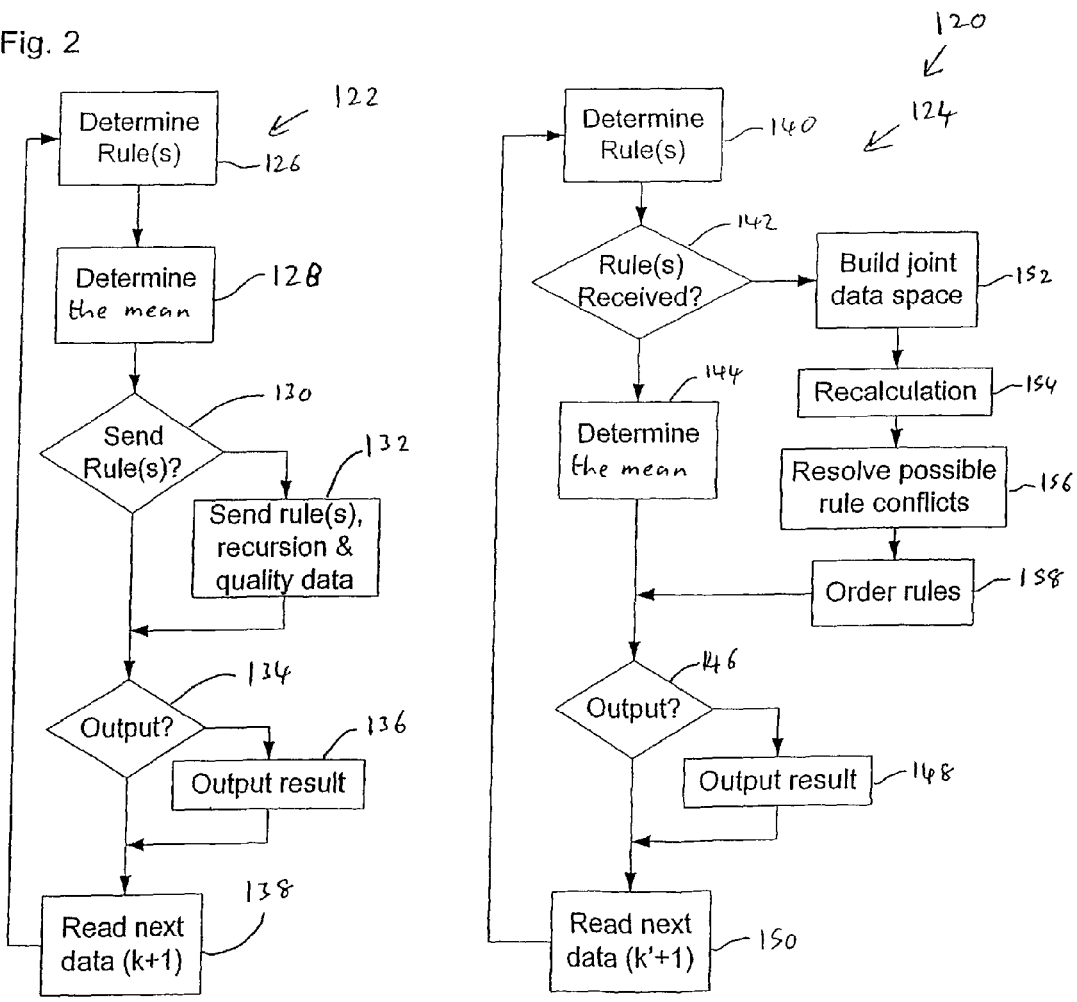
FIG. 2 shows a high level process flow chart illustrating the method of the invention.
Figure 3A:
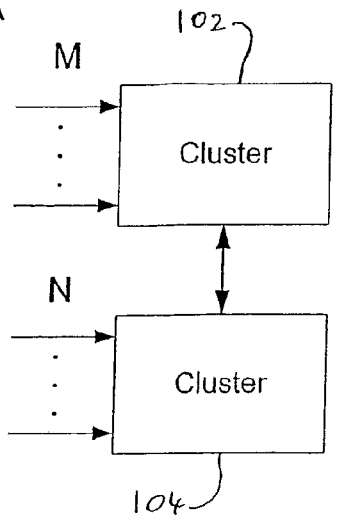
Figure 3B:
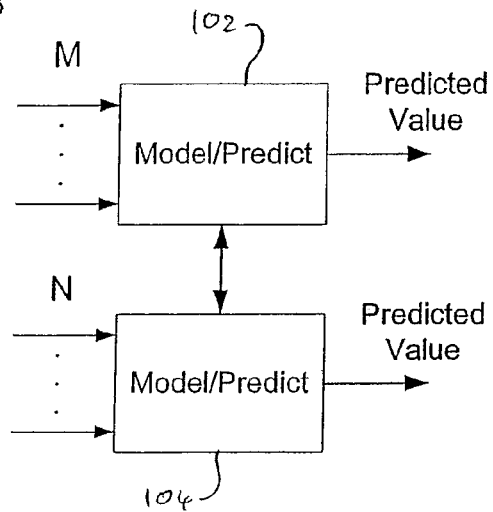
Figure 3C:
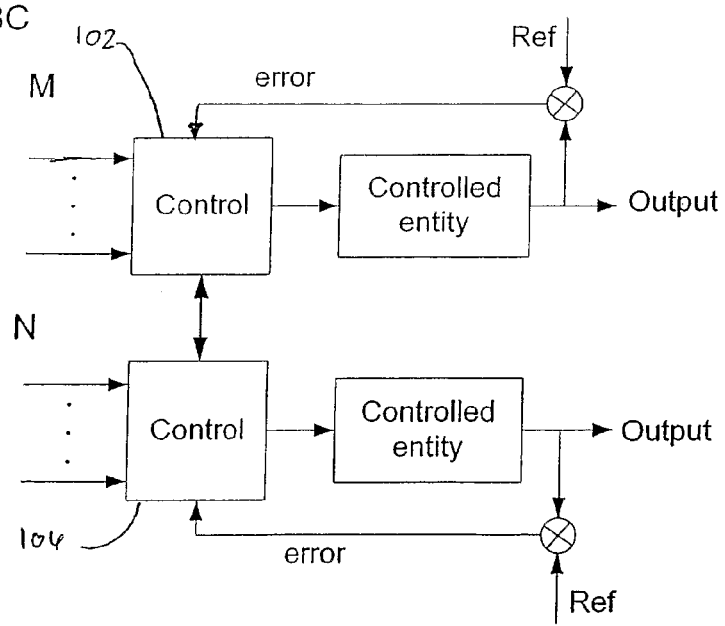
Figure 3D:
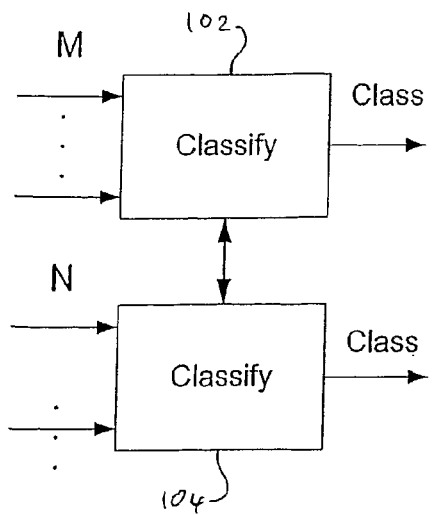
Figure 4:
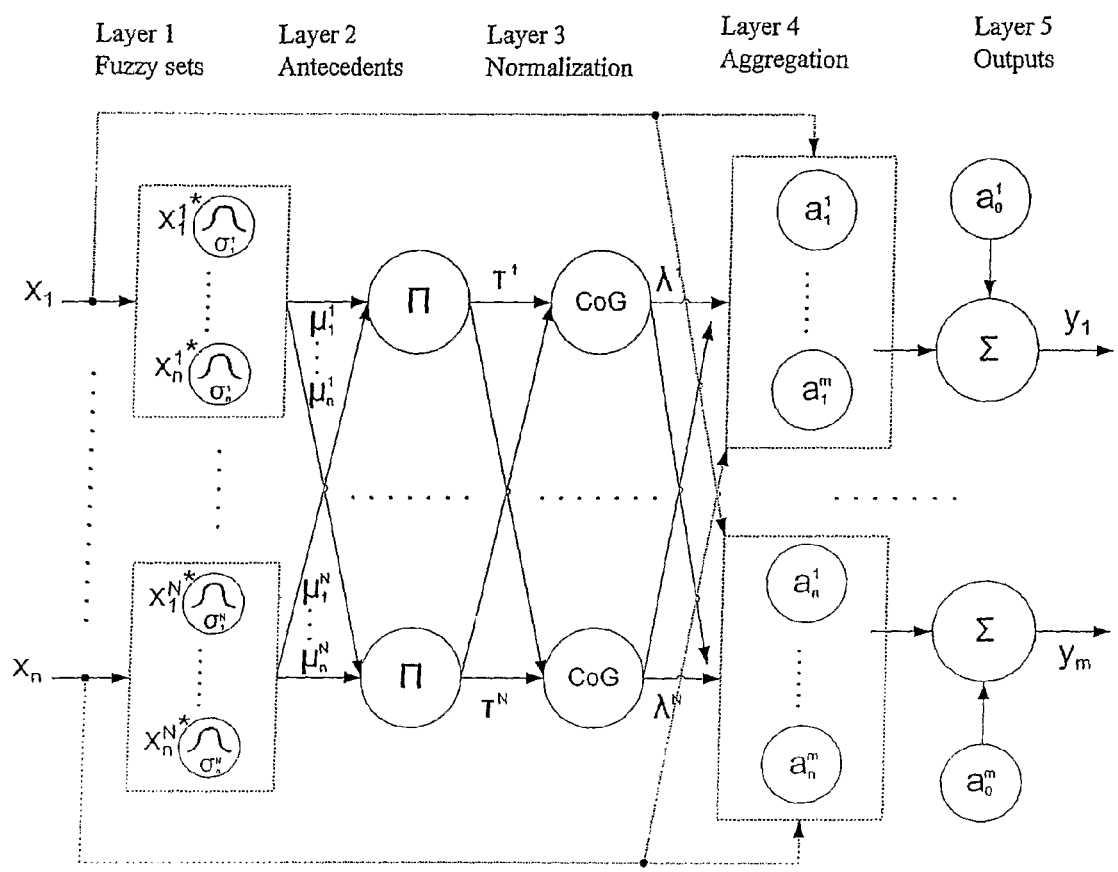
Figure 4A:
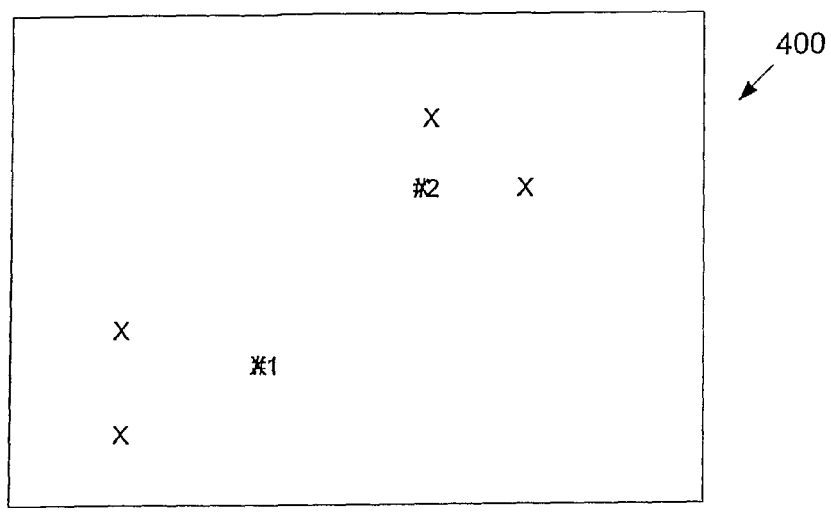
Figure 4B:
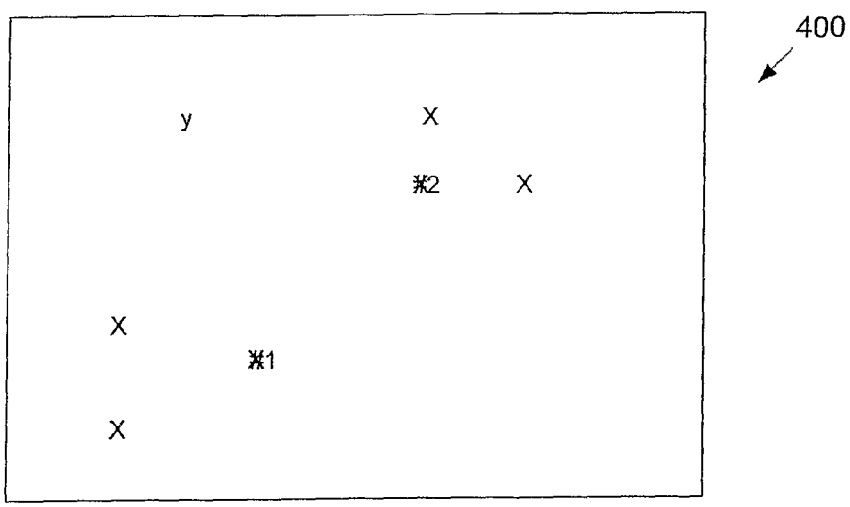
Figure 4C:
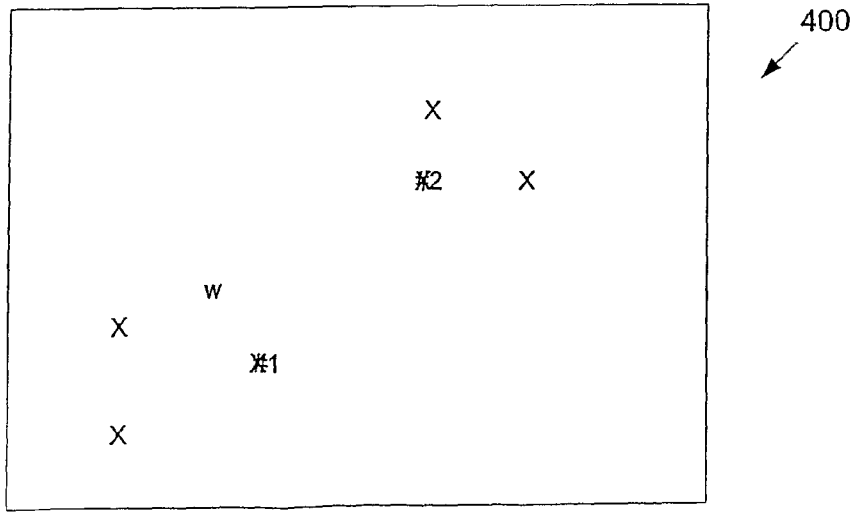
Figure 5:
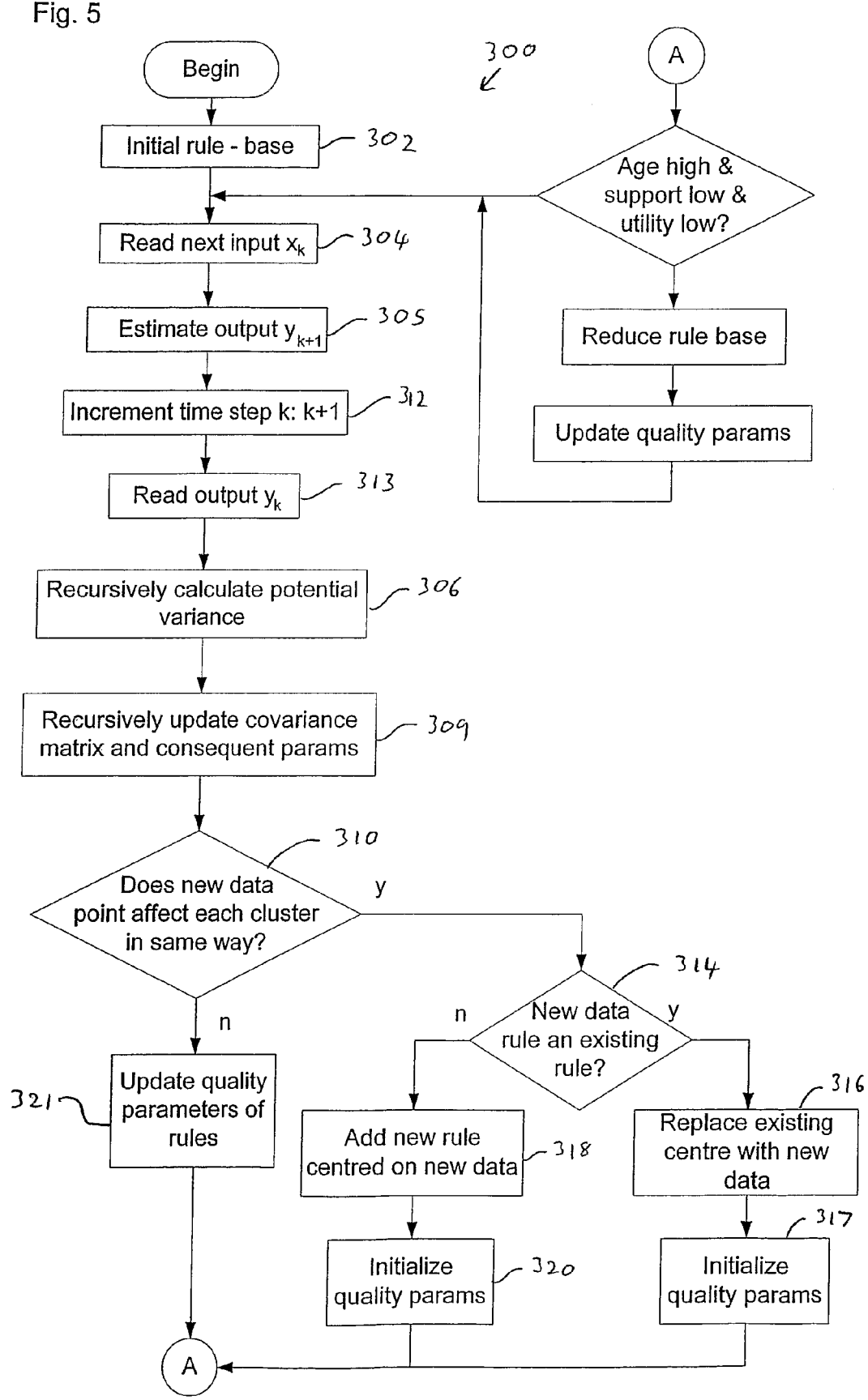
Figure 6:
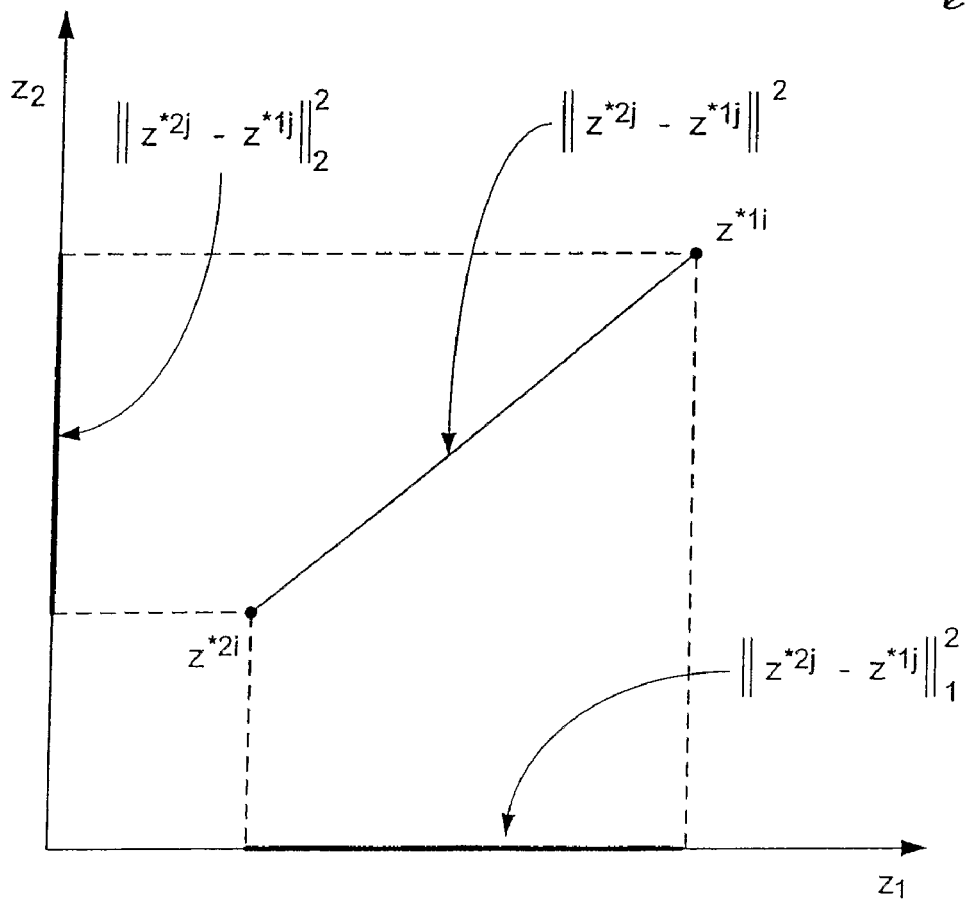
Figure 7:
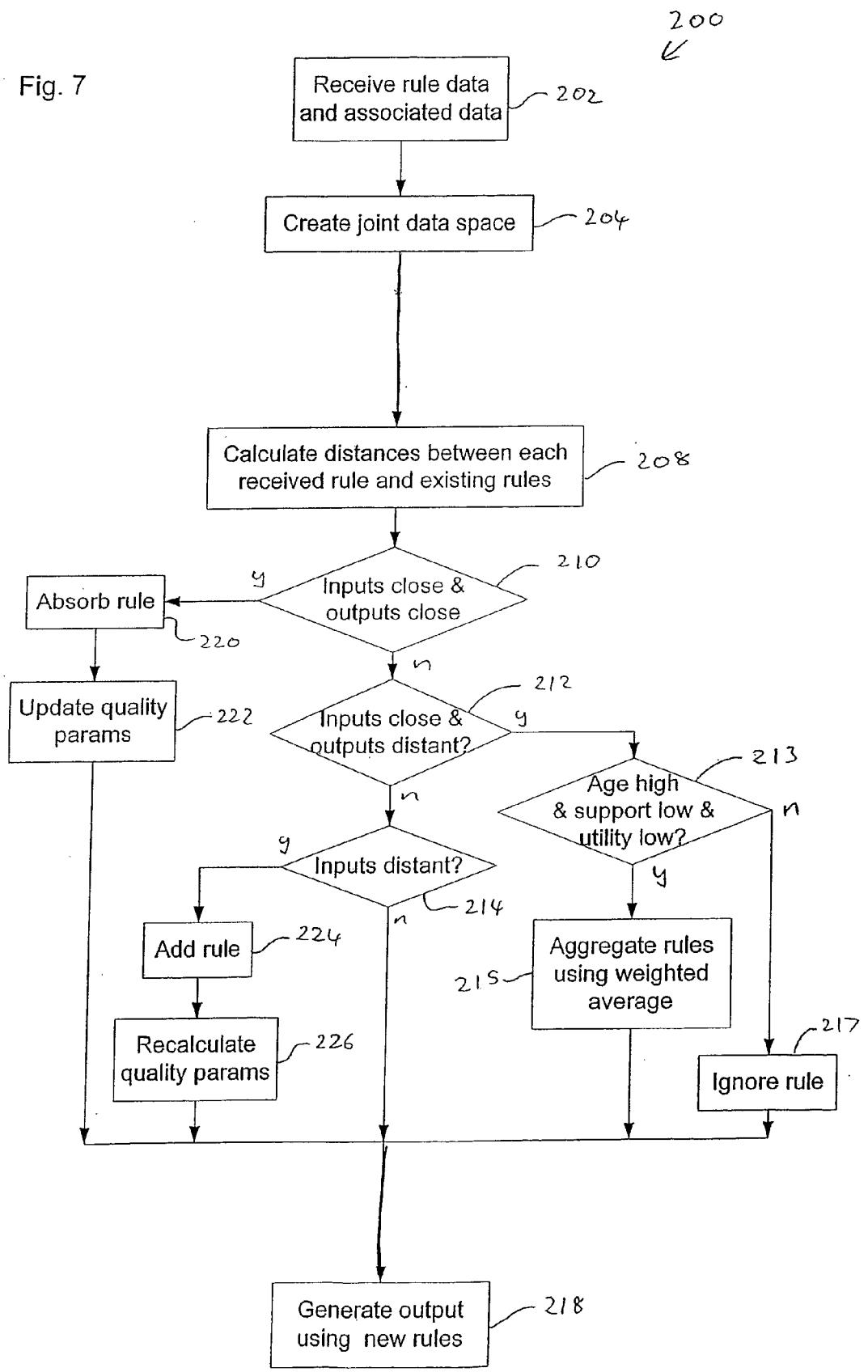

FIGS. 3A to 3D respectively illustrate schematic diagrams of different applications of the cooperative learning system of the invention;

FIG. 4 shows a schematic illustration of the neuro-fuzzy system used in the present invention;

FIGS. 4A to 4C show a graphical representation of a data space illustrating the effect of a new data point on the spatial density of data points for previously existing rules;

FIG. 5 shows a process flow chart illustrating the main processing loops of FIG. 2 in greater detail;

FIG. 6 shows a graphical representation illustrating similarity in a joint input/output data space;

FIG. 7 shows a process flow chart illustrating the rule aggregation process of FIG. 2 in greater detail; and FIG. 8 shows a graphical representation of a joint input/output data space for entities with non-matching dimensionalities Like items in the different Figures share common reference signs unless indicated otherwise. With reference to FIG. 1 there is shown a schematic block diagram of a co-operative fuzzy rule-based machine learning system 100 according to one aspect of the invention. The system includes a first entity 102 and a second entity 104 being separate computing processes. Each entity receives a number of inputs in the form of time series data 106, 108 which the entities process to generate their respective rules and to make predictions or classifications 118 and 119. From time to time, the entities can transfer data 110 including metadata describing their rules, and various data items which are used in the recursive generation of rules or to indicate the quality of the rules, so that a one of the entities can learn from the experience of the other. The data 110 can be sent from one entity to the other or can be exchanged between entities so that both entities learn from each other via a communication link 113.

FIG. 1 is schematic only and a number of different embodiments are envisaged. There needs to be at least two entities in order for the learning data 110 to be transferred, however any number of entities may exist in a system and the learning data can be transferred between a one and some or all of the other entities or exchanged between some or all of the entities in the system. Each entity will typically have multiple different time series data inputs and the number and type of inputs each entity has may differ from entity to entity.

As illustrated in FIG. 1, each entity is realised or implemented as a separate computing process 112, 114 but each process may be running on the same host hardware, as illustrated by dashed box 116, or on separate, different host hardware. In the latter case, the data 110 can be transferred between hardware hosts using a number of mechanisms, such as over a bus, or using a wired or wireless network, including LANs, WANs, and other typical communication mechanisms by which computing processes can communicate.

Before describing the invention in greater detail, a high level over view of the general method of the invention will be provided with reference to FIG. 2. FIG. 2 shows a process flow chart 120 illustrating the data processing operations 122 that are carried out by the first entity 102 and the data processing operations 124 that are carried out by the second entity 104. Each entity carries out the more general learning method aspect of the invention. Moreover, a single entity can carry out the general learning method aspect of the invention, as described below and illustrated in FIG. 2, in which case the steps of determining whether to send and sending rule, recursion and quality data are omitted.

When the first entity receives its first data input or data point, then at step 126, a first rule is generated using the input data. Then at step 128 the mean value of the rule centres is set to the first data point. For the first data point, the rule and its corresponding mean value are unlikely to be of interest. However, at step 130, a determination can be made whether to transfer the data representing the rules and the data needed by the second entity to learn using the transmitted rule data. Various events can trigger the transfer of the rule and associated data. For example, the first entity can automatically send the rule and associated data at certain times or on receiving a certain number of data inputs. Alternatively, or additionally, the second entity can send a request to the first entity that the rule and associated data be sent. Irrespective of the mechanism used to determine whether to send the rules and associated data, if it is determined at step 130 that they should be sent, then they are sent to the second entity at step 132. Either way, processing proceeds to step 134 at which the first entity determines whether any output is required.

The nature of any output will depend on the specific application of the fuzzy rule based system. The different types of application are generally illustrated in FIGS. 3A to 3D. Each of FIGS. 3A to 3D shows a first entity 102 with M inputs and a second co-operating entity 104 with N inputs (where N is not necessarily equal to M). Each entity can have none, one or more outputs. The types of application can generally be characterised as clustering, modelling or prediction, control and classification, depending on how the fuzzy rules are used. In a clustering type application the system generally evolves and the data cluster into a number of distinct clusters in which each cluster corresponds to a different but unclassified state of the system. In a modelling or prediction type application, the system predicts or models a value or values for the thing being modelled using the input data. In a control type application, at least one of the outputs of the system is returned as a feed back input so as to allow a value or parameter to be controlled according to the system defined by the fuzzy rules. In a classification type application, the system outputs a classification based on the input data indicating what class the input data is considered to correspond to.

At step 136, the result is output, which may be in the form of a prediction, classification or location of the centres of the clusters and their radius/shape. Then at step 138, processing returns to step 126 and the next data input is received by the entity and the rules are re-determined at step 126. Processing generally continues to loop until all the time series data has been processed or the incoming data stream ends.

In parallel, the data processing operations 124 are executed by the second entity. The second entity receives its own time series data (denoted k') as input and may or may not have the same number and type of time series data inputs. At step 140 rules are determined and at step 142 it is determined whether rule and associated data has been received from the first entity. In some embodiments, rule and associated data can be received by the second entity before it has received any input data, in which case the second entity 'starts' with the rules defined by the transferred rule data. In other embodiments, the second entity can begin evolving its own rules based on its data inputs and then alter those rules when rule data is received from the first entity. If it is determined at step 142 that rule data has not been received then processing proceeds to steps 144, 146, 148 and 150 similarly to the corresponding steps for the first entity.

When it is determined at step 142 that rules and associated data have been received from the first entity, then at step 152 a combined data space is created for the combined input data of the first entity and the second entity (as the number and types of input data may be different for the first and second entities). Then at step 154 various parameters and values, such as the mean values of the rule centres, are recalculated for the joint data space as will be described in greater detail below. Then at step 156 possible conflicts between rules of the first entity and rules of the second entity are resolved based on the proximity of clusters in the joint data space. At step 158, the combined or adapted rules for the second entity are ordered by importance. Then for the second entity, the output result is determined using the combined rules.

In other embodiments, the second entity can also transfer rule data and associated data to the first system so that the first system can adapt its rules and learn from the second entity.

Hence, by transferring only metadata representing the rules of the first system, rather than having to transfer all of the data input to the first system which resulted in those rules, a more efficient method for allowing different entities to co-operatively learn from each other is provided.

The theoretical underpinnings of an embodiment of the invention will now be described in greater detail.

According to the evolving systems paradigm, the structure of the neuro-fuzzy system (NFS), a fuzzy-rule based system that is represented as a neural network, is not fixed but it gradually evolves (can expand or shrink). The spread of the membership functions that also represents the radius of the zone of influence of the clusters and respective fuzzy sets is considered to be adaptive, recursively updated. The quality of the clusters and fuzzy rules respectively in terms of their age and support is monitored in real-time.

A multi-input-multi-output (MIMO) generalized Takagi-Sugeno (gTS) NFS, as illustrated in FIG. 4 is considered, which can be described as a set of fuzzy rules of the following form:

$$R^i: \text{IF}(x_1.\text{is.close.to.}x_1^{i*}) \text{AND} \ldots \text{AND}(x_n.\text{is.close.to.}x_n^{i*}) \quad (1)$$

$$\text{THEN}(y^i = f^i)$$

where $R^i$ denotes the $i^{th}$ fuzzy rule; $i=[1,N]$; N is the number of fuzzy rules;
$x=[x_1, x_2, \ldots, x_n]^T$ is the input vector; $(x_j.\text{is.close.to.}x_j^{i*})$ denotes the $i^{th}$ fuzzy sets of the $j^{th}$ fuzzy rule; $j=[1,n]$; $x^{i*}$ is the focal point of the $i^{th}$ rule antecedent; $y^i=[y_1^i, y_2^i, \ldots, y_m^i]$ is the m-dimensional output of the $i^{th}$ linear sub-system.

The data is assumed to be standardized. That is:

$$x = \frac{x_{raw} - \bar{x}}{\sigma_x};$$

$$y = \frac{y_{raw} - \bar{y}}{\sigma_y}$$

where $x_{raw}$ denotes raw (not-standardized input data)
$y_{raw}$ denotes raw (not-standardized output data)
$\bar{x}$ denotes the mean of the input data
$\bar{y}$ denotes the mean of the output data
$\sigma_x$ denotes the standard deviation (variance) of the input data
$\sigma_y$ denotes the standard deviation (variance) of the output data The mean and the standard deviation can be calculated recursively by:

$$\bar{x}(k) = \frac{k-1}{k}\bar{x}(k-1) + \frac{1}{k}x(k);$$

$$k = 2, 3, \ldots$$

$$\bar{y}(k) = \frac{k-1}{k}\bar{y}(k-1) + \frac{1}{k}y(k);$$

$$k = 2, 3, \ldots$$

$$\sigma_x^2(k) = \frac{k-1}{k}\sigma_x^2(k-1) + \frac{1}{k-1}(x(k) - \bar{x}(k))^2$$

$$\sigma_y^2(k) = \frac{k-1}{k}\sigma_y^2(k-1) + \frac{1}{k-1}(y(k) - \bar{y}(k))^2$$

with initial values $\bar{x}(1)=x(1)$, $\bar{y}(1)=y(1)$, $\sigma_x^2(1)=0$, and $\sigma_y^2(1)=0$. The zeroes are n and m dimensional vector columns respectively for x and y.

The type of the fuzzy rule depends on the type of the consequent:
a) It is of first order TS type when the consequents are linear:

$$f^i = x_e^T \pi^i; \quad x_e^T = [1, x^T] \quad (2a)$$

where $$\pi^i = \begin{bmatrix} \alpha_{01}^i & \alpha_{02}^i & \cdots & \alpha_{0m}^i \\ \alpha_{11}^i & \alpha_{12}^i & \cdots & \alpha_{1m}^i \\ \cdots & \cdots & \cdots & \cdots \\ \alpha_{n1}^i & \alpha_{n2}^i & \cdots & \alpha_{nm}^i \end{bmatrix}$$

are the parameters of the m local linear sub-system
b) It is of zero order TS type (that can also be considered as a simplified Mamdani, sM type) when the consequents are singletons (crisp scalar values):

$$f^i = a^i \quad (2b)$$

where $a^i = [\alpha_{01}^i \alpha_{02}^i \alpha_{0m}^i]^T$ are the parameters of the m local linear sub-models.

Equations (1) and (2b) describe sM model while the conventional Mamdani type fuzzy model assumes fuzzy consequents. The overall output of the NFS, y is formed as a collection of loosely/fuzzily combined multiple simpler sub-systems, $y_i$. The degree of activation of each rule is proportional to the level of contribution of the corresponding sub-system to the overall output of the NFS.

$$y = \sum_{i=1}^{N} \lambda^i y^i; \quad (3)$$

$$\lambda^i = \frac{\tau^i}{\sum_{j=1}^{N} \tau^j}$$

where $y^i$ represents the output of the $i^{th}$ sub-model; $\lambda^i$ is the normalized activation level of the $i^{th}$ rule; $\tau^i$ is the firing level of the $i^{th}$ rule.

The activation level can be defined as a Cartesian product (t-norm) of respective fuzzy sets for this rule:

$$\tau^i = \prod_{j=1}^{n} \mu_j^i(x_j) \quad (4)$$

where $\mu_j^i$ is the membership value of the $j^{th}$ input $x_j$, $j=[1,n]$, to the $i^{th}$ fuzzy set, $i=[1,N]$;

The membership function can be of any form. The Gaussian bell function is preferable due to its generalization capabilities (it resembles normal distribution and covers the whole domain of the variables, thus avoids possible computational problems):

$$\mu_j^i = e^{-\frac{\|x - x^{i*}\|_j^2}{2(r_j^i)^2}} \quad (5)$$

where $(r_j^i)^2$, $i=[1,N]$ $j=[1,n]$ is the spread of the membership function, which also represents the radius of the zone of influence of the cluster/rule/neuron.

The NFS of this embodiment as described by equations (1)-(2) can be graphically represented as a five-layer feed-forward neural network 160 as illustrated in FIG. 4. The first layer consists of neurons corresponding to the membership functions of particular fuzzy set. This layer takes as inputs the data, x and gives as output the degree, µ to which these fuzzy descriptors are satisfied. The second layer represents the antecedent parts of the fuzzy rules. It takes as inputs the membership functions values and gives as output the firing level of the i-th rule, $\tau^i$. The third layer of the network takes as inputs the firing levels of the respective rule, $\tau^i$ and gives as output the normalized firing level, $\lambda^i$ as Centre of Gravity (CoG) of $\tau^i$. As an alternative it is possible to use mean-of-maxima (MoM) or 'winner takes all' operator. This operator can be used in classification, while CoG is preferred for time-series prediction and general system modeling and control. The fourth layer aggregates the antecedent and the consequent part that represents the local sub-systems (singletons or hyper planes). Finally, the last fifth layer forms the total output of the NFS. It performs a weighed summation of local sub-systems according to equation (3).

Having described the structure of the gTS NFS, its evolution from data in real time will now be described. This corresponds generally to the general learning method aspect of the invention illustrated by steps 126, 128, 134 & 138 and 140, 144, 146 and 150 of FIG. 2.

A first phase of the evolution of gTS involves partitioning the input/output data space. Each one of the sub-systems of the NFS operate in a certain sub-area of the input/output data space, $z=[x^T;y^T]^T$; $z \in R_{n+m}$. To identify these regions real-time clustering can be employed to effectively learn the antecedent part of the fuzzy rules (1)-(2). Some previous approaches cluster the input data only, but in order to find regions of similar functional input-output dependence, $y=f(x)$ the joint input/output data space has to be considered. Clustering input data only may result in fuzzy models with conflicting, contradictory consequents.

Two parameters are used to define a membership function of the type given by equation (5), namely the focal point, $x^{i*}$ and the spread, $r_j^i$. If you locate the focal points of the rules, $x^{i*}$ at the cluster centre (in which only coordinates for the inputs are used to define the focal point, although coordinates of the outputs are also used in the clustering) and then you determine the spread, $r_j^i$ based on the data, the antecedent part of the fuzzy rules are defined.

The real-time clustering approach used herein stems from the subtractive clustering and Mountain clustering approaches. However, this method has the following specific features that distinguish it from the other clustering approaches. It is non-iterative as no search is involved. It has very low memory requirements, because recursive calculations are used. It is fully unsupervised in the sense that the number of clusters is not pre-defined as they are determined based on the data density alone. It can start 'from scratch' from the very first data sample, which is assumed to be the first cluster centre. It can use data that is not normalized and it is parameter free with the radius of influence of the clusters adapting to the data pattern automatically. Changes of the cluster number and parameters are gradual, incremental, and not abrupt.

The clustering method is based on the potential variance that each data point brings to the existing cluster structure. As used herein, "potential variance or increment" is used to refer to the effect on the spatial density of data points that a data point for a new time series data item brings to the previously existing data points of the previously existing centres of clusters/rules. The invention does not require the direct computation of potential but rather indirectly determines the effect of new data point by using equation 8 defined below.

A simplified overview of the method of the invention will be provided before returning to a more rigorous description of the invention.

With reference to FIGS. 4A to 4C, there are shown schematic representations of an input/output data space 400 with data points therein. FIG. 4A shows the combined input/output data space with 6 data points in it (x's) which are in two clusters. Each cluster has a centre (#), being one of the data points, and there are two different rules in the rule base (each rule being associated with a different one of the two cluster centres).

FIG. 4B shows a first situation in which a new data point (y), corresponding to a new item of time series data, has been added to the data space.

It is determined whether this new data point y increases or decreases the spatial density of data points for the first centre (#1) (considering all of the data points in the data space). It is also determined if this new data point y increases or decreases the spatial density of data points for the second centre (#2). New data point y is included in determining the spatial density of data points. The spatial density of data points centred on the position of data point y is not determined. In this case y, decreases the spatial density of data points for both centres #1 and #2, and so a new centre #3 is created (located at the position of data point y) and a third rule is added to the rule base. As the third rule is not similar to the first rule or the second rule (as #3 is not close to #1 or #2) none of the old rules are removed from the rule base.

FIG. 4C shows a second situation in which a new data point (w) has been added to the data space. As described above, it is determined whether this new data point w increases or decreases the spatial density of data points for the first centre (#1) (considering all of the data points in the data space) and it is also determined if this new data point w increases or decreases the spatial density of data points for the second centre (#2). In this case w, increases the spatial density of data points for centre #1, but decreases the spatial density of data points for centre #2, and so no new centre and associated rule is created.

Returning to the more formal description of the invention, potential calculated at a data point is a function of accumulated proximity which represents the density of the data surrounding this data point:

$$P_k(z_k) = \frac{1}{1 + \frac{1}{k-1}\sum_{j=1}^{n+m}\sum_{i=1}^{k-1} \|z_i - z_k\|_j^2} \quad (6)$$

where $P_k(z_k)$ denotes the potential of the data point $(z_k)$; calculated at time k starting from k=2; n+m defines the dimensionality of the input/output data space ($z \in R^{n+m}$).

The present invention does not calculate the potential (6) for each cluster centre directly. The potential resulting from the new data point which is given by equation (6) can be calculated recursively as described in Angelov P., D. Filev, *An Approach to On-line Identification of Takagi-Sugeno Fuzzy Models, IEEE Transactions on System, Man, and Cybernetics, part B—Cybernetics*, vol. 34, No 1, 2004, pp. 484-498.

The projections of the squared distances can be expressed in an explicit form for the time step k as:

$$P_k(z_k) = \frac{1}{1 + \frac{1}{k-1}\sum_{i=1}^{k-1}\sum_{j=1}^{n+m}(z_{jk}^2 - 2z_{jk}z_{ji} + z_{ji}^2)} \quad (7)$$

The potential variance or increment used in the present invention can be expressed as a difference (positive or negative) between the potential of the new data point calculated at the time instant k and the potential of the cluster/rule center calculated at the same time instant:

$$\Delta_k^{i*} = P_k(z_k) - P_k(z^{i*}) \quad (8)$$

Combining (6) and (8) leads to:

$$\Delta_k^{i*} = \frac{1}{1 + \frac{1}{k-1}\left\{\sum_{l \in L_i}\sum_{j=1}^{n+m}(z_{jk}^2 - 2z_{jk}z_{jl} + z_{jl}^2) + \sum_{j=1}^{n+m}(z_{jk}^2 - 2z_{jk}z_j^{i*} + (z_j^{i*})^2)\right\}} \quad (9)$$

$$- \frac{1}{1 + \frac{1}{k-1}\left\{\sum_{l \in L_i}\sum_{j=1}^{n+m}\{(z_j^{i*})^2 - 2z_j^{i*}z_{jl} + z_{jl}^2\} + \sum_{j=1}^{n+m}\{z_{jk}^2 - 2z_{jk}z_j^{i*} + (z_j^{i*})^2\}\right\}}$$

Where $L_i = \{1, 2, \ldots, i*-1, i*+1, \ldots, k-1\}$ denotes a set of (k−2) indices (all indices from 1 to (k−1) excluding the index i*. Reorganizing (9) gives:

$$\Delta_k^{i*} = \frac{\sum_{j=1}^{n+m}\left\{((z_j^{i*})^2 - z_{jk}^2) + 2(z_{jk} - z_j^{i*})\sum_{l \in L_i} z_{jl}\right\}}{(k-1)denom1 * denom2} \quad (10)$$

Where $denom1 =$ $$1 + \frac{1}{k-1}\left\{\sum_{l \in L_i}\sum_{j=1}^{n+m}\{z_{jk}^2 - 2z_{jk}z_{jl} + z_{jl}^2\} + \sum_{j=1}^{n+m}\{z_{jk}^2 - 2z_{jk}z_j^{i*} + (z_j^{i*})^2\}\right\}$$

$denom2 = 1 +$ $$\frac{1}{k-1}\left\{\sum_{l \in L_i}\sum_{j=1}^{n+m}\{(z_j^{i*})^2 - 2z_j^{i*}z_{ji} + z_{jl}^2\} + \sum_{j=1}^{n+m}\{z_{jk}^2 - 2z_{jk}z_j^{i*} + (z_j^{i*})^2\}\right\}$$

Equation (10) can be further simplified as follows $$\Delta_k^{i*} = \frac{(k-2)}{(k-1)denom1 * denom2}\left\{\sum_{j=1}^{n+m}\{(z_j^{i*})^2 - z_{jk}^2 + 2(z_{jk} - z_j^{i*})\bar{z}_j^{i*}\}\right\} \quad (11)$$

Where $$\bar{z}_j^{i*} = \frac{1}{(k-2)}\sum_{l \in L_i} z_{lj}$$

is the mean of all points except the i*-th cluster/rule center and the last (k−1)-th point. Since both denominators (denom1 and denom2) express sums of distances they are positive by definition. Similarly, (k−2)/(k−1) is also positive. Therefore, the sign of $\gamma_k^{i*}$ determines the sign of the potential increment, $\Delta_k^i$, where $$\gamma_k^{i*} = (z_j^{i*}) - z_{jk}^2 + 2(z_{jk} - z_j^{i*})z_j^{i*} \quad (12)$$

If the sign of the potential variance $\Delta_k^{i*}$, is the same for each and every preexisting cluster/rule then the new data point brings innovation to the spatial distribution of the data points in the combined input/output data space. One can judge this by observing the sign of $$\sum_{j=1}^{n+m} \gamma_k^{i*}.$$

If it is the same for all previously existing (N) rules then the potential variance is the same for each previously existing rule. The overall sign of the potential increment for all previously existing N rules can be calculated by:

$$\delta_k = \left| \sum_{i=1}^{N} \operatorname{sign} \sum_{j=1}^{n+m} \gamma_k^{i*} \right| \quad (13)$$

The mean, $\bar{z}_j^{i*}$ used in (11) can be calculated by subtracting the value of the i*-th center from the mean of all points up to (k−1)-th:

$$\bar{z}_j^{i*} = \quad (14)$$

$$\frac{1}{(k-2)}\sum_{l \in L_i} z_{jl} = \frac{1}{(k-2)}\left(\sum_{l=1}^{k-1} z_{jl} - \bar{z}_j^{i*}\right) = \frac{(k-1)}{(k-2)}\bar{z}_{j(k-1)} - \frac{1}{(k-2)}\bar{z}_j^{i*}$$

Where $$\bar{z}_{j(k-1)} = \frac{1}{(k-1)}\sum_{l=1}^{k-1} z_{jl}$$

is the mean of all points up to the (k−1)-th. It can easily be calculated recursively by:

$$\bar{z}_{j(k-1)} = \frac{(k-2)}{(k-1)}\bar{z}_{j(k-2)} + \frac{1}{(k-1)}z_{j(k-1)} \quad (15)$$

If the new data point does not change the potential in the same way (i.e., increases or decreases) for all of the existing clusters/rules, then:

$$0 < \delta_k < N \quad (16)$$

and it is assumed that the data point is well represented by the existing centers and therefore a new rule is not required. Thus, the cluster structure is not changed.

If the data point does change the potential in the same way for all of the previously existing rules, then:

$$\delta_k = N \quad (17)$$

and a new cluster/rule is formed around this point.

In this case, it is determined if the new rule describes well any of the currently existing cluster/rule centres using the following expression:

$$\exists i^* \mu^{N+1}(x^{i*}) > e^{-1} \quad (18)$$

From statistics the 'one-sigma' value is used as a reference that translates into a value of the membership function u $\mu^{N+1}(x^{i*})$ of $e^{-1} \approx 0.384$ If both conditions (17) and (18) hold then at least one previously existing cluster/rule centre is described with degree 0.384 by the new rule and thus this cluster/rule is removed and is replaced by the new rule as being redundant.

This approach is prototype-based in that some of the data points are used as prototypes of cluster centers. A number of previous algorithms that concern NFS learning use mean-based clustering. The centers are located at the mean, which, in general, does not coincide with any data point. Therefore, these approaches usually form large number of clusters that it is later necessary to 'prune'. These clustering approaches are thresholds-based and the result highly depends on the selection of the appropriate threshold(s).

The clustering procedure of the invention starts 'from scratch' assuming that the first data point available is a centre of a cluster (the value of its potential increment is set to the ideal value, $\delta_1$<1). This assumption is temporary and if a priori knowledge exists the procedure can start with an initial set of cluster centers that will be further refined. The coordinates of the first cluster centre are formed from the input coordinates of the first data point ($x^{1*} \leftarrow x_1$). The mean value is initialized with the first data point ($\bar{z}^* \leftarrow z^{i*}$). Starting from the next data point, which is read in real-time, the following steps are performed:

1) calculate the overall sign of the potential increment or variance for all previously existing rules, and including the latest data point, $\delta_k$ using (12)-(13).
2) update the mean value of all data points using equation (15);
   3) If the potential variance has the same sign for all previously existing rule/cluster centres (i.e., equation (17) holds) then a new cluster centre is added based on the new data point ($x^{(N+1)*} \leftarrow x_k$). If the new rule describes well (as described in (18)) at least one of the previously existing cluster/rule centres then the or each previously existing cluster centre(s) is removed.
   a) If the potential variance is not the same for all of the previously existing rule (equation (16) holds), then the rule base is not changed.

These basic steps are repeated for the next data sample (k←k+1) until there is no more available data or until a requirement to stop the process is received.

Various quality measures of the generated clusters can be computed. In a real-time application only cluster centers and the mean value of the positions of all the data points in the data space are kept in the memory that are N+1 values of dimension (n+m), while all the other data points are discarded. The question arises 'how well these centers represent the data that were discarded from the memory?'. One way to address this issue is by monitoring properties of the clusters that are formed. These include their radius (zone of influence), support, age, and local potential.

Support of the cluster (rule) is simply the number of data points that are in the zone of influence of that cluster/rule. It can be determined by assigning each data point at the moment it is first read to the nearest cluster:

$$S^l \leftarrow S^l + 1 \text{ for } l = \operatorname*{argmin}_{i=1}^{N} \|z_k - z^{i*}\| \qquad (19)$$

where $S^l$ is the support of the $l^{th}$ cluster; $l=[1,N]$

Due to the incremental nature of the approach the relevance of a cluster (respectively fuzzy rule) may change. One of the measures of the relevance of the rule is its support and especially the ratio of the support in terms of the overall number of data points available at a moment of time, k. A simple rule for ignoring (practically, removing) fuzzy rules that have very low support can be introduced (defined by a threshold):

$$\text{IF } \left(\frac{S_k^i}{k} < \varepsilon\right) \text{ THEN } (\lambda^i \leftarrow 0) \qquad (20)$$

This rule is optional. The value of the threshold $\varepsilon$ represents the proportion of the data assigned to the $i^{th}$ cluster (rule) as a ratio to all data.

An insight of the distribution of the data inside the cluster and thus about the representative strength of a cluster centre can be obtained from the local scatter and local potential respectively. The concept of data density represented through the Mountain function or the potential was originally introduced in a global sense—it represented the accumulated spatial proximity between all the data points.

The local scatter is a measure of the data distribution in a cluster and it is calculated as an accumulated sum of projections of the distances between the data points in a cluster and its centre on the axes $[0;x_j]$, $j=[1,n]$; $i=[1,N]$ normalized by the support of the cluster:

$$\sigma_{jk}^i = \sqrt{\frac{1}{S_k^i} \sum_{l=1}^{S_k^i} \|z^{i*} - z_l\|_j^2}; \qquad (21)$$

$$\sigma_{j1}^i = 1$$

When a new cluster (rule) is added, $N \leftarrow N+1$, its local scatter is initialized based on the average of the local scatters for the existing clusters (rules):

$$\sigma_{jk}^{N+1} = \frac{1}{N} \sum_{i=1}^{N} \sigma_{jk}^i, \qquad (22)$$

$$j = [1, n+m]$$

Local potential, L represents the data density (accumulated spatial proximity) between the data points in a cluster:

$$L_k^i = \frac{1}{1 + \sum_{j=1}^{n+m} \sigma_{kj}^i} \qquad (23)$$

These measures of the cluster quality can be used for real-time management of the rule-base and as an additional decision when generating new clusters/rules/neurons.

The value of the spread of the membership functions, r that also represents the radius of the zone of influence of the clusters has been kept fixed during the learning in evolving TS, eTS models, and is described in Angelov P., D. Filev, *An Approach to On-line Identification of Takagi-Sugeno Fuzzy Models, IEEE Transactions on System, Man, and Cybernetics, part B—Cybernetics*, vol. 34, No 1, 2004, pp. 484-498, incorporated herein by reference for all purposes. In the method of this invention, a more efficient and more flexible recursive formulation of the radius/spread is introduced that is more realistic. Indeed, in real cases, the spatial distribution of the samples is difficult to be pre-estimated and it is time varying.

A recursive formula for adaptive calculation of the radius based on the local spatial density is introduced as follows:

$$(r_{jk}^i)^2 = \alpha (r_{j(k-1)}^i)^2 + (1-\alpha)(\sigma_{jk}^i)^2 \qquad (24)$$

where $\sigma_{jk}^i$ is the local scatter; $\alpha$ is a constant that regulates the compatibility of the new information with the old one.

A suggested value for $\alpha$ is 0.5. The value of $\alpha$ should not exceed one because this will lead to an instable recursive expression.

The spreads of the fuzzy membership functions, $r_j^i$ (respectively the radius of the clusters) are different for different inputs and outputs ($j=[1,n+m]$) as well as for different fuzzy rules ($i=[1,N]$). This makes possible to define not just hyper-spherical, but also hyper-ellipsoidal clusters that recursively adapt their shape in real-time to the spatial information brought in by new data samples.

Hyper-ellipsoidal clusters were first introduced for MIMO-evolving TS in Angelov P., C. Xydeas, D. Filev, *On-line Identification of MIMO Evolving Takagi-Sugeno Fuzzy Models, International Joint Conference on Neural Networks and International Conference on Fuzzy Systems, IJCNN-FUZZ-IEEE*, Budapest, Hungary, 25-29 Jul., 2004, 55-60, incorporated herein by reference for all purposes, but they were fixed, while the shape of the clusters used in gTS evolves in real-time following the data density evolution.

Another parameter that describes the properties of the clusters is the age. It can be defined as the number of data samples minus the average sum of the time indices of the data samples:

$$age_k^i = k - \frac{A_k^i}{S_k^i}; \qquad (25)$$

$$l = [1, N]$$

where $$A_k^l = \sum_{i=1}^{s_k^l} I_i$$

denotes the accumulated time of arrival; $I_i$ denotes the index of the $i^{th}$ data sample (the time instant when this data point was read).

The accumulated time of arrival is calculated in a similar way to the support (19), but in respect to the indices:

$$I_k^l \leftarrow I_k^l + k \text{ for } l = \underset{i=1}{\overset{N}{\operatorname{argmin}}} \|z_k - z^{i*}\| \qquad (26)$$

In the extreme case, when all of the data samples go into the same cluster/rule, the A is determined as a sum of the arithmetic progression:

$$A_k = 1 + 2 + \ldots k = \frac{(k+1)k}{2} \qquad (27)$$

The age of the cluster has values in the range [0;k] with values close to 0 meaning that recent data is included in this cluster (a young cluster) and values close to k meaning that no recent data is included (an old cluster). Old clusters can be replaced by new clusters that bring potential variance to all of the existing rules with the same sign.

Utility is the accumulated firing level of each rule given by equation (3) summed over the life of each rule:

$$U_k^l = \frac{1}{k - I_k^l} \sum_{i=1}^{I_k^l} \lambda^l \qquad (28)$$

A second phase involves learning the consequent part's parameters when the application is not clustering. Once the antecedent part of the fuzzy model is determined and fixed the identification of parameters of the consequent part, $\pi^i$ can be solved as a recursive least square (RLS) estimation problem. The real-time algorithm must perform both tasks (data partitioning and parameter estimation) at the same time instant (per data point) for a time significantly shorter than the sampling period.

In this way, the antecedent part of the rules (layers 1-3 of the NFS) can be determined in a fully unsupervised way, while the consequent part (layers 4-5 of the NFS) requires a supervised feedback. The supervision is in the form of error feedback which guarantees optimality (subject to fixed rule base/neural network structure) of the parameters of the consequent part.

The overall output of the gTS NFS given by equation (1)-(2) can be re-written into a vector form as follows:

$$y = \psi^T \theta \qquad (29)$$

where $\theta = [(\pi^1)^T, (\pi^2)^T, \ldots, (\pi^N)^T]^T$ is a vector formed by the sub-system parameters; $\psi = [\lambda^1 x_e^T, \lambda^2 x_e^T, \ldots, \lambda^N x_e^T]^T$ is a vector of the inputs that are weighted by the normalized activation levels of the rules, $\lambda^i$, i=[1,N] for the first order TS model (2a) and $\psi = [\lambda^1, \lambda^2, \ldots, \lambda^N]^T$ for the sM, (2b).

For a given data point, $z_k = [x_k^T; y_k^T]^T$ the optimal in LS sense solution $\hat{\theta}_k$ that minimizes the following cost function:

$$(Y - \Psi^T \theta)^T (Y - \Psi^T \theta) \rightarrow \min \qquad (30)$$

can be found applying weighted RLS, wRLS (which is described in more detail in Angelov P., D. Filev, *An Approach to On-line Identification of Takagi-Sugeno Fuzzy Models*, IEEE Transactions on System, Man, and Cybernetics, part B—Cybernetics, vol. 34, No 1, 2004, pp. 484-498, incorporated herein by reference for all purposes):

$$\hat{\theta}_k = \hat{\theta}_{k-1} + C_k \psi_k (y_k - \psi_k^T \hat{\theta}_{k-1}) \qquad (31)$$

$$C_k = C_{k-1} - \frac{C_{k-1} \psi_k \psi_k^T C_{k-1}}{1 + \psi_k^T C_{k-1} \psi_k} \qquad (32)$$

where $\hat{\theta}_1 = 0$; C is a N(n+m)×N(n+m) co-variance matrix; $C_1 = \Omega I$; $\Omega$ is a large positive number; I is the identity matrix; k=2, 3, . . . .

wRLS is fuzzily weighted through the activation levels and is not the conventional weighted RLS which is directly applicable under the assumption that the model (1)-(2a) has a fixed structure. Under this assumption the optimization problem (30) is linear in parameters. The concept of evolving systems assumes a gradually evolving model structure. As a result the activation level of the fuzzy rules, $\lambda^i$ will change. These changes (even infrequent and gradual in the sense that only one out of N rules is affected) have retrospective effect in the sense that they affect previously calculated activation levels, $\lambda_j^i$ (i=[1,N]; j=[1,k-1]). To avoid this problem a specific type of re-setting of the covariance matrix of the RLS algorithm can be used each time a new rule is added to the rule-base:

$$\zeta_{ij}^{reset} = \begin{cases} \zeta_{ij}^{reset} = \frac{N^2 + 1}{N^2} \zeta_{ij}^{reset}; & i = [1, N(n+m)]; \\ & j = [1, N(n+m)] \\ 0; & i \neq j, i, j = [N(n+m) + \\ & 1, (N+1)(n+m)] \\ \zeta_{ij}^{reset} = \Omega; & i = j, i, j = [N(n+m) + \\ & 1, (N+1)(n+m)] \end{cases} \qquad (33)$$

where $\zeta_{ij}$ is an element of the co-variance, C which is defined by equation (32);

In other words, the covariance matrix elements that are representative for the N existing rules are multiplied by the factor $$\frac{N^2 + 1}{N^2}$$

due to the increased number of rules, [3] while the elements of the co-variance matrix that are representative for the newly added (N+1)$^{th}$ rule are initialized in the usual way (with a diagonal matrix and large values, $\Omega$ in the main diagonal).

FIG. 5 shows a process flow chart illustrating a process 300 by which the above described method, corresponding to the main loops of 122 and 124, operates in general. The data for the rule base is initialised at step 302 which can include declaring variables and setting their initial values. Then at step 304, the first input data for the first time step, i.e. k=1, is read for the M or M' inputs of the system.

At step 305 the output, $y_{k+1}$ is estimated using equation (29) except when the embodiment is clustering. Then at step 312 the time step is incremented to k+1 and the next actual, rather than estimated, data output, $y_{k+1}$ is determined at step 313. If clustering is being carried out then step 313 is omitted. Then at step 306 the potential variance for the new data sample is calculated using equations (12)-(13). At step 309 the covariance matrix and consequent parameters are recursively updated using equations (31) and (32) respectively. If clustering is being carried out then step 309 is omitted. At step 310 it is determined whether the potential variance of the new data point has the same sign for each previously existing cluster centre/rule by comparing the overall sign of the potential variance to the rule number, N using equation (17). If the potential variance does not have the same sign to each of the existing N rules (equation (16) holds) then the cluster structure is not altered and at step 321 the quality parameters (age, support, utility, and local potential) of the rule are updated at step 321 and processing proceeds to step 322.

If at step 310 it is determined that the potential variance is equal to N, then at step 314 it is determined whether the new rule describes an existing rule/centre as expressed by equation (18). If so, then the new data point replaces the existing centre at step 316. This effectively updates an existing rule. Then at step 317 quality parameters (age, support, utility, and local potential) of the rule that replaces an existing rule are initialized.

Processing then proceeds to step 322. If it is determined at step 314 that the new rule does not describe an existing centre, then processing proceeds to step 318 and a new cluster is formed around the new point. This effectively adds a new rule to the rule base. Then at step 320 the parameters of the quality of the new cluster (rule) are initialized. Processing then proceeds to step 322.

At step 322 IF (age is high) AND (support is low) AND (local potential is low) THEN the rule base is reduced at step 324 as described in equation (20) for the support. Then the quality parameters of the values are updated at step 326. The process proceeds to step 304 and a next data item in the time series data is processed.

Hence, as new input data is received by the system, it determines the relevance of the data point by calculating its potential variance using equations (12)-(13) and comparing it to the number of existing clusters/rules, N. If the potential variance is with the same sign for each one of the existing rules then the new data is added as a new cluster/rule centre or an existing rule centre that is described well by the new rule (according to equation (18)) is replaced by the new rule.

The process keeps repeating until the data input ceases.

Having described the processing carried out during the main loops of 122 and 124, the theoretical underpinnings of the inclusion of transferred rules into the rule base, corresponding generally to steps 152 to 158, will now be described.

With reference to FIG. 6 there is shown a schematic illustration of similarity in the joint input/output data space 340 of the first and second entities, where $z^{*2j}$ represents the co-ordinates of the cluster/rule centre of the jth rule of the second entity and $z^{*1i}$ represents the co-ordinates of the cluster/rule centre of the ith rule of the first entity A 2-dimensional simplified representation is shown in FIG. 6 in which M=M'=2) in order to help visualize the joint data space, in which $z_1$ and $z_2$ are two of the inputs or outputs of the two entities.

The entity sending the rule data, in this example the first entity, has an M-dimensional input/output vector, the second entity has an M'-dimension input/output vector and Q is the number of inputs/outputs that are present in both entities. $x^{*ii}$ is the centre of the i-th cluster/rule in the first entity, where $i=[1,N^1]$ (the number of rules for the first entity), and $x^{*j2}$ is the centre of a cluster/rule in the second entity, where $j=[1,N^2]$ (the number of rules for the second entity).

The simple case is that M=M'=Q in which case the number of dimensions of both entities match, as illustrated in FIG. 6. However, if the number of dimensions of the entities does not match, then an (M+M'−Q) dimensional joint data space 350 that is a union of both data spaces is used as illustrated in FIG. 8 (in which M=2, M'=1 and hence Q=1)

For the first entity, the rules can be expressed as $R_1^1$: IF ($x_1$ is close to $x_1^{*11}$) AND ...

$$\text{AND } (x_n \text{ is close to } x_n^{*11}) \text{ THEN } (y^{11} = f^{11})$$

$\vdots$ $R_1^1$: IF $(x_1$ is close to $x_1^{*N_1 1})$ AND ... AND $(x_n$ is close to $x_n^{*N_1 1})$ THEN $(y^{N_1 1} = f^{N_1 1})$ and for the second entity, the rules can be expressed as $R_{N_1}^2$: IF ($x_1$ is close to $x_1^{*12}$) AND ... AND $$(x_n \text{ is close to } x_n^{*12}) \text{ THEN } (y^{12} = f^{12})$$

$\vdots$ $R_{N_2}^2$: IF $(x_1$ is close to $x_1^{*N_2 2})$ AND ...

$$\text{AND } (x_n \text{ is close to } x_n^{*N_2 2}) \text{ THEN } (y^{N_2 2} = f^{N_2 2})$$

The data transferred between entities, which includes the meta data describing the rules and the associated data, which includes, amongst other things, data used to learn from the transmitted rules and for recursive calculations and aggregation of knowledge and describing the quality of the clusters, include the following, per rule, i.

The rule data includes the centres of the clusters/rules $x^{*li}$, for $i=[1,N^1]$, the spreads $r^1$, the number of inputs, $n^1$ to the first entity, number of data points presented to the first entity, k and optionally the number of rules $N^1$.

The associated data includes a number of parameters of the consequents which are used for continuation of learning the rule that is being transmitted, namely $\pi^{1i}$ (defined by equation (2a) above) and the number of outputs of the first entity $m^1$.

The associated data also includes the mean of all data, $\bar{z}_{k-1}^1$ and some initialisation parameters, namely $\Omega^1$ and $r^1$.

The associated data also includes indicators of the quality of the clusters/rules, namely age ($A^{1i}$), given by equation (25) above, support ($S^{1i}$), given by equation (19) above, local potential ($L^{1i}$), given by equation (23) above, and utility ($U^{1i}$), given by equation (28) above.

The associated data can also include auxiliary parameters that are needed for continued learning of the consequent parameters, namely the covariance matrix, $C^1$, given by equation (32) and the weighted inputs $\psi^1$, given by equation (29).

FIG. 7 shows a process flow chart illustrating a method 200 of carrying out steps 152 to 158 of FIG. 2 in greater detail.

At step 202, the rule data and associated data described above are received by the second entity. The second entity also receives data indicating the types of the M different inputs to the first entity so that the second entity can determine whether any of the M' inputs to the second entity are different. In the trivial case, the M inputs are the same as the M' inputs and so there is no difficulty as the joint input/output data space has the same dimensions as illustrated in FIG. 6). Where there are Q common input types, then the dimensions of the data space is effectively M+M'−Q as illustrated in FIG. 8.

In order to determine the common input types, a data item can be transferred from the first entity which provides a sequence of data items identifying the data types of the cluster/rule centre values $x^{*li}$ for the inputs to the first entity. For example, if the inputs to the first entity are temperature, pressure and pH, then a data string indicating this could be T; P; pH. If the inputs to the second entity are temperature, pressure and volume, then a data string identifying the input types could be T; P; V. By reading the data strings associated with the input data types, the second entity can determine that there are two data types not common to the first and second entities and so the joint data space will have four dimensions (i.e. 3+3−2) for temperature, pressure, pH and volume and is created at step 204.

Then at step 208 the distance between each rule that has been received from the first entity and each of the existing rules of the second entity is determined in the joint data space. For the case where the dimensionality of the first and second entities is the same, this is simply determining the Euclidean, Mahalonobis, or cosine distance.

In the joint input/output data space, the overall distances are given by $$d_{ij} = \|z^{*1i} - z^{*2j}\|$$

which helps to determine if the rules from the first entity bring new information or if they are close to rules of the second entity.

For the inputs only, the distances for each input is given by $$d_{ij}^x = \|x^*_1{}^{1i} - x^{*2j}\|$$

where $x^{*1i}$ is the centre of the cluster for the $i^{th}$ rule of the first entity and $x^{*2j}$ is the centre of the cluster for the jth rule of the second entity. This value indicates how similar the antecedent parts of the fuzzy rules are.

Similarly, for the outputs only, the distances for each output are given by $$d_{ij}^y = \|y^*_1{}^{1i} - y^{*2j}\|$$

where $y^{*1i}$ is the centre of the cluster for the $i^{th}$ output of the first entity and $y^{*2j}$ is the centre of the cluster for the jth output of the second entity where i=[1,M] and j=[1,M']. This value indicates how similar the conclusions are.

For the more complex case where the dimensionalities of the first and second entities do not match, M≠M', then the distance is not between two points in an M+M'−Q dimensional space, but is between hyperplanes with dimensions M and M'−Q if M'>M or M−Q if M>M', respectively. Therefore it is necessary to calculate partial Euclidean, or Mahalonobis, distances.

In the joint input/output data space, the partial distances can be calculated using $$d_{ij} = \sqrt{\frac{1}{\min(M, M')} \sum_{l=1}^{\min(M,M')} \left(z_l^{*1i} - z_l^{*2j}\right)^2}$$

for all rules i of the first entity and all rules j of the second entity, where l is a running parameter over the different dimensions, and which indicates the closeness or similarity of the rules. For the inputs only, partial distances for each of the common input rules (i.e. up to the minimum value of M or M') is calculated using $$d_{ij}^x = \|x^{*1i} - x^{*2j}\| = \sqrt{\frac{1}{\min(M, M')} \sum_{l=1}^{\min(M,M')} \left(x_l^{*1i} - x_l^{*2j}\right)^2}$$

where $x^{*1i}$ is the centre of the cluster for the ith rule of the first entity and $x^{*2j}$ is the centre of the cluster for the jth rule of the second entity. This value indicates how similar the rules are.

Similarly, for the outputs only, the partial distances for each output is given by $$d_{ij}^y = \|\pi^{*1i} - \pi^{*2j}\|$$

where $\pi^{1i}$ is the transferred value for the ith output of the first entity and $\pi^{2j}$ is the value for the jth output of the second entity. This value indicates how similar the conclusions are.

If a cosine-based distance is used then the problem with the match of the dimensionalities of the first and second entities does not exists. In the joint input/output data space, the cosine-based distance can be calculated using $$d_{ij} = \frac{\sum_{l=1}^{\min(M,M')} z_l^{*1i} z_l^{*2j}}{\sqrt{\sum_{l=1}^{M} (z_l^{*1i})^2 \sum_{l=1}^{M'} (z_l^{*2i})^2}}$$

For the inputs only, partial distances for each of the common input rules (i.e. up to the minimum value of M or M') is calculated using $$d_{ij}^x = \frac{\sum_{l=1}^{\min(M,M')} x_l^{*1i} x_l^{*2j}}{\sqrt{\sum_{l=1}^{M} (x_l^{*1i})^2 \sum_{l=1}^{M'} (x_l^{*2i})^2}}$$

Then at steps 210, 212 and 214, based on the distances, it is determined whether to absorb the rule (if the transferred rule is similar to an existing rule), how to deal with contradictory rules (as the transferred rule and an existing rule have different conclusions) or whether to add a new rule to the existing rules (if the transferred rule is sufficiently dissimilar to all existing rules).

At step 210 it is determined whether the transferred rule is sufficiently similar to an existing rule, and the conclusions are sufficiently similar, that the rule can be absorbed into the existing rule. In particular:

IF $((d_{ij}^x < r_{ij})$ AND $(d_{ij}^y < r_{ij}))$ THEN $$age^{2j} \leftarrow age^{2j} + \frac{k_2}{k_1} age^{1i}$$

$$S^{2j} \leftarrow S^{2j} + S^{1i}$$

$$L^{2j} \leftarrow \frac{L^{2j} \cdot S^{2j} + L^{1j} \cdot S^{1j}}{S^{1i} + S^{2j}}$$

$$U^{2j} \leftarrow \frac{U^{2j} \cdot (k_2 - l_{k_2}^{2j}) + U^{1i} \cdot (k_1 - l_{k_1}^{1i})}{(k_2 - l_{k_2}^{2j}) + (k_1 - l_{k_1}^{1i})}$$

$$\bar{z}^{2j} \leftarrow \frac{\bar{z}^{2j} k_2 + \bar{z}^{1i} k_1}{k_2 + k_1}$$

That is, the received rule is absorbed at step 220 and the quality parameters are updated accordingly at step 222. Here, $r_j$ is the spread or radius. In particular, age, S, L, U, $\bar{z}$ are recalculated and $k=k_1+k_2$, which indicates the total number of data points read so far by the first and second entities.

Here, j designates the index of the rule of the second entity and i designates the index of the rule from the first entity. The recalculate local potential $L^{2j}$ is compared with the previous value for the same rule and the rule with the highest value of local potential is kept and the rule with the lower local potential is discarded.

If the conditions of step 210 are met so that the rule has been absorbed, then processing proceeds to step 218. Then, if required, the output can be determined using the new rule base which includes the rule absorbed from the first entity. Hence the second entity has 'learned' from the first entity even though the second entity has not received any of the raw data input to the first entity.

If the transferred rule is not absorbed at step 210, then at step 212, it is determined whether the transferred rule is sufficiently similar to an existing rule in terms of its antecedent part, but the conclusions are sufficiently dissimilar, that accepting the rule would lead to a contradiction. In particular:

IF $((d_{ij}^x < r_{ij})$ AND $(d_{ij}^y \geq r_{ij}))$

AND

IF $(age^{1i} > age_{Threshold})$ OR $(S^{1i} < S_{Threshold})$

OR $(U^{1i} < U_{Threshold})$

THEN $y^{2j} = y^{2j}$

ELSE $y^{2j} \leftarrow \dfrac{y^{1i} \cdot S^{1i} + y^{2j} \cdot S^{2j}}{S^{1i} + S^{2j}}$ That is, if the separation of the inputs is small but the separation of the outputs is large and if certain criteria relating to age, support and utility are not met, then the output for the jth rule of the receiving entity is left the same. If the separation of the inputs is small but the separation of the outputs is large then processing proceeds to step 213 at which it is determined whether the age of the ith rule from the first entity is greater than a threshold age value, and the support for the ith rule from the first entity is less than a threshold support value, and the utility of the i-th rule from the first entity is less than a threshold utility value. If so then at step 215, the output for the jth rule of the receiving entity is set to a weighted average of the outputs. This reflects the importance of transferred rules which either have an old age, low support or low utility, any of which can be considered to show the relevance of the rule. Else, the rule is ignored at step 217.

Once any conflicting rule has been dealt with processing proceeds to step 218 as described above.

If at step 214 it is determined that the separation between the inputs for the rules is sufficiently large, i.e.

$d_{ij}^x > r_{ij}$ then the rule that has been received is added to the rule base at step 224 and the quality parameters and other associated data are recalculated at step 226 as described above. Processing then proceeds to step 218 as described previously.

Hence, whenever rule data and associated data is transferred from one entity to the other, the receiving entity can incorporate the rule into its own rule base and modify it behaviour accordingly. In this way the experience of the first entity gleaned from its input data can be 'learned' by the second entity without having to supply the input data to the second entity. As will be appreciated, the second entity can receive the rule data at its beginning, before receiving its own input data, or after it has started generating its own rule base as a result of its own input data. The second entity can receive rule data and associated data multiple times relating to the same or different rules.

It will be appreciated that in other embodiments, the first entity can also receive rule data and associated data from the second entity. It will also be appreciated that more than two entities can be provided with one or more of the entities transferring rule data and associated data to one or more of the other entities.

In another embodiment, the invention can include automatically selecting the input variables to be used in the method. This feature is particularly useful when the invention is used in an application in which there are a large number of potential inputs. The computational load increases rapidly with the number of inputs, so it is preferable to reduce the number of inputs actually used. The importance of each of a number of potential inputs is quantified so that by setting a threshold level it is possible to iteratively discard inputs that are not making a significant contribution. This results in much faster computation, but without significant loss of analytical performance.

Further, by reducing the number of inputs a gain in computational performance can be achieved in some cases.

In greater detail, an inputs utility is defined per rule as the relative usage or importance of certain inputs:

$$\xi_{jk}^i = \dfrac{\left|\sum_{l=1}^{k} \dfrac{\partial y_l^i}{\partial x_{jl}}\right|}{\sum_{l=1}^{k}\sum_{j=1}^{n}\left|\dfrac{\partial y_l^i}{\partial x_{jl}}\right|} = \dfrac{\left|\sum_{l=1}^{k} \pi_{il}^j\right|}{\sum_{l=1}^{k}\sum_{j=1}^{n}|\pi_{il}^j|} \qquad (34)$$

where $y^i$ represents the output of the $i^{th}$ sub-model calculated at the l-th time instant; $\pi_l^i$ is the consequent parameters of the $i^{th}$ rule calculated at the l-th time instant.

The inputs utility parameter, $\xi_{jk}^i$, can be contrasted with the rule utility, $U_k^i$, discussed above.

Additionally, a relative inputs utility is defined as a normalized value of the inputs utility:

$$\bar{\xi}_{jk}^i = \begin{cases} \dfrac{\xi_{jk}^i}{\max_{j=1}^{n} \xi_{jk}^i}; & n > 20 \\ \dfrac{\xi_{jk}^i}{\sum_{j=1}^{n} \xi_{jk}^i}; & n \leq 20 \end{cases}$$

A different normalization factor is used for a larger number of inputs (n>20), as otherwise the sum of the inputs' utilities would mask the result.

The consequent parameters can be determined by a locally optimal, in LS sense, solution (as an alternative to the globally optimal solution represented by equation (30):

$$\sum_{i=1}^{N} (Y - X^T \pi_i)^T \Lambda_i (Y - X^T \pi_i) \to \min$$

The solution can be found applying weighted RLS, wRLS (which is described in more detail in Angelov P., D. Filev, *An Approach to On-line Identification of Takagi-Sugeno Fuzzy Models*, IEEE Transactions on System, Man, and Cybernetics, part B—Cybernetics, vol. 34, No 1, 2004, pp. 484-498, incorporated herein by reference for all purposes), in which:

$$\hat{\pi}_{ik} = \hat{\pi}_{ik-1} + c_{ik} x_{ek} \lambda_i(x_k)(y_k - x_{ek}^T \hat{\pi}_{ik-1})$$

$$c_{ik} = c_{ik-1} - \frac{\lambda_i(x_k) c_{ik-1} x_{ek} x_{ek}^T c_{ik-1}}{1 + \lambda_i(x_k) x_{ek}^T c_{ik-1} x_{ek}}$$

where $\hat{\pi}_{i0} = 0$; C is a N(n+m)×N(n+m) co-variance matrix; $c_0 = \Omega I$; $\Omega$ is a large positive number; I is the identity matrix; k=2, 3, . . . .

The input variables (which in classification applications are often called features) for which the inputs utility is low are automatically removed from the model at each step of the algorithm by applying the rule:

$$\text{IF } (\bar{\zeta}_{j*k}^i < 3\%, \forall i) \text{ THEN Remove feature } x_{j*}^i \text{ such that } x_{j*}^i \mid j* = \underset{j=1}{\overset{n}{\arg\min}} (\bar{\zeta}_{j*k}^i) \quad (35)$$

The threshold of 3% can be varied in a range of 0-20%, having a preferred range of 0.5-5%, with 3% suggested as the best value.

Respectively, the covariance matrix, $c_{ik}$ is updated by removing columns and lines respective to j*.

Having explained a general embodiment of the invention in detail, some example applications will now be given although it will be appreciated that the invention has application over a much wider range and is not to be considered limited to the specific applications given herein by way of example only.

An example application is to rank order the importance of inputs to the system so that the most important out of a large number of inputs can be identified and, e.g., brought to the attention of a human operator or used in a control system. This provides a 'smart' system which can itself determine which inputs are most important. For example, such an approach could be used for a nuclear power station, chemical plant and similar complex systems where there is a need to monitor hundreds or thousands of variables and determine which are the most significant.

One example application is prediction from time series data and in particular predicting the behaviour of an engine from a number of inputs, such as two temperatures of the engine oil, the oil viscosity and the oil pressure. The first system receives the temperature, pressure and viscosity measurements as four time series data inputs in real time and the rules generated by the first system allow some other property or properties of the engine to be predicted from the input values. Then after a number of rules has been established, for example seven or eight, meta data defining the rule base of the model and the associated data can be transferred to a second system having the same inputs but for a different engine. Hence the second system can immediately start predicting the behaviour of the engine from its time series data inputs without first having to generate the rules of the model. The rules for the second system can evolve to reflect any differences between the behaviour of the two engines. Other prediction type applications would include electrical load forecasting and financial modelling, such as predicting the behaviour of financial markets or other financial systems.

Another example application is an intelligent (soft) sensor that can be used to model in real-time the quality parameters of products in an oil refinery, such as naphtha, kerosene, gas oil. The invention can also be used to model and predict implacability parameters (such as Abel or Pensky-Martnes). The result will be a rule-base that is generated from data and is used to substitute expensive and inconvenient laboratory tests usually performed once a day.

Another example application is classification of EEG signals to identify the sensation of pain. A rule base can be generated by collecting time series EEG signals from a plurality of channels and obtaining a further input from a patient for each set of EEG signals to indicate whether pain is being experienced (for example by inducing pain in the patient). The rule base can then be generated which identifies those EEG signals on various of the channels which can be equated with the sensation of pain. For example certain EEG signal shapes on a subset of the channels can correspond to the sensation of pain. Then, the rule meta data and associated data can be transferred over a hospital network to a plurality of other computing devices having similar EEG signal inputs so that those EEG machines can be used to classify whether the EEG signals of the patients being monitored correspond to pain or not, i.e. y=0 or 1.

Another example application is real-time clustering of Internet-based textual documents (such as web pages), in which the formation of clusters can be used to group the huge number of Internet-based documents returned in response to a query to a search engine. This clustering can be done based on the frequency of occurrence of key words related to the search term or phrase. Key words are words that appear in the same sentence or nearby a search term or phrase. The result will be a well grouped set of textual documents.

Another example application is clustering, in which the formation of clusters of rules can be used to differentiate between different types of inputs without classifying the different clusters. An example is mapping of environments by a robotic device. A first wheeled robotic device can include a camera for capturing images and image processing algorithms to extract features from the images. The robotic device can be controlled by a mapping algorithm such as a wall following algorithm, in which the robot measures the distance to obstructions and the rotation of the robot. The features from the image processing and the distance and rotation can be provided as inputs for generating the first rule base. The robot can be left to automatically travel round the environment and generate rules. For example one rule or cluster may correspond to a left handed corner and another rule or cluster may correspond to a right handed corner or a dead end. There is no need to actually determine what each rule cluster actually corresponds to in the real world. A second robot in a different environment can then receive the rule meta data and associated data from the first robot and then immediately begin to navigate about its own environment as it will now have rules indicating what to do should it encounter obstacles similar to those already encountered by the first robot. Hence, the second robot can learn from the first robot.

Another robotic applications, but of a classification type, would include co-operative learning for automated mine clearing in which the rules generated by a first robot in identifying mines from its inputs can be shared with other mine clearing robots so that they can learn from the experience of the first robot.

Another application of the control type, and again in the field of robotics, would be improving the control of navigation. A wheeled robot can output control signals to drive its left and right wheels to allow its drive and direction to be controlled. Some measure of the error in the direction and/or drive of the robot, such as a proportional, integral or differential of the error signal, can be fed back as a further input to the rule based system on the robot so that rules can be generated which help to reduce the error signal and hence more accurately control the robot. The rule meta data and associated data can then be transmitted to other robots so that they can also use the rules to help control themselves. For example, the first robot may learn control rules for a first terrain, e.g. a slippery terrain, such as ice, which can then be transmitted to the other robots so that when they encounter a similar terrain, they can already control themselves without having to go through a significant learning process.

Generally, embodiments of the present invention employ various processes involving data stored in or transferred through one or more computers or data processing devices. Embodiments of the present invention also relate to apparatus and systems for performing these operations. The apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will appear from the description given below.

In addition, embodiments of the present invention relate to computer program code, computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Although the above has generally described the present invention according to specific processes and apparatus, the present invention has a much broader range of applicability than the specific example given. In particular, the present invention is not limited to any particular kind of application and can be applied to virtually any application where it would be useful for different entities to be able to co-operate in learning from the experience of another entity or entities. One of ordinary skill in the art would recognize other variants, modifications and alternatives in light of the foregoing discussion.

The invention claimed is:

1. A computer implemented method for co-operative learning by at least a first entity supporting a first rule based system and a second entity supporting a second rule based system, the method comprising:
    the first entity generating a rule base from input data supplied from at least one input and having recursion data used to recursively update the rule base as a result of newly received input data;
    the first entity sending rule data defining at least one rule of the rule base of the first entity and associated data, including the recursion data, to the second entity;
    the second entity determining whether to update the rule base of the second entity using the transmitted rule data, and if so then using the recursion data to recursively determine the updated rules for its rule base.

2. The method as claimed in claim 1, wherein determining whether to update the rule base of the second entity includes:
    forming a joint data space for the first system and the second system; and determining the separation in the joint data space of the inputs for a transferred rule and the separation in the joint data space for the outputs for the transferred rule; and using the separations to determine whether to absorb the rule, reject the rule or create a new rule.

3. The method as claimed in claim 2, and further comprising:
    determining whether the first entity and the second entity have the same dimensions, and if not then determining a partial separation in the joint data space.

4. The method as claimed in claim 1, wherein the recursion data includes data representing the mean of all data from the first, transmitting entity.

5. The method as claimed in claim 1, wherein the associated data further comprises parameters of the consequents that can be used to continue learning from the transmitted rule.

6. The method of claim 1, wherein the associated data further comprises at least one indicator of the quality of the rules.

7. The method of claim 6, wherein the at least one indicator includes at least one of age; support; utility; and local potential.

8. The method of claim 1, wherein the associated data further comprises initialisation parameters.

9. The method of claim 1, wherein the associated data further comprises auxiliary parameters for continuing clustering by the second entity.

10. The method of claim 1, wherein the second entity sends rule data defining the rules of the rule base of the second entity and associated data, including recursion data, to the first entity.

11. The method of claim 1, wherein the first entity sends rule data defining at least one rule of the rule base of the first entity and associated data, including the recursion data, to a plurality of different entities each supporting a rule based system.

12. The method of claim 1, wherein the first and/or second entity generates an output using the current rules of its rule base.

13. The method as claimed in claim 12, wherein the output is data or a signal representing a prediction, classification, clustering or control.

14. A computer implemented method for machine learning by a first entity supporting a rule based system, wherein each rule is associated with a centre of a cluster of data points in a combined rule input and rule output data space, the method comprising:

receiving a time series data item as input;

determining whether a data point for the time series input data item increases or decreases the spatial density for each previously existing rule;

if the data point does increase or decrease the spatial density for every previously existing cluster, then creating a new cluster and associated rule, otherwise, if the data point does not increase the spatial density for every previously existing cluster, or does not decrease the spatial density for every previously existing cluster, then not creating a new cluster; and repeating the method for a next time series data item received.

15. The method of claim 14, further comprising:

determining if the newly created rule is similar to any of the previously existing rules, and if so then removing the previously existing rule or rules from the rule base.

16. The method of claim 14, and further comprising recursively recalculating a measure of the spread of each cluster in the data space.

17. The method of claim 14, and further comprising:

calculating a mean position in the data space of all previous data points;

and using the mean position in determining whether the data point for the time series input data item increases or decreases the spatial density for every previously existing cluster.

18. The method of claim 14, wherein determining whether the data point for the time series input data item increases of decreases the spatial density of data points for all previously existing clusters, includes determining whether the sum of the number of increases of spatial density or decreases of spatial density for every previously existing cluster is equal to the number of previously existing cluster centres.

19. The method of claim 1, wherein there are a plurality of different potential inputs, and further comprising:

determining which of the plurality of different potential inputs to use as actual inputs by quantifying the importance of each potential input to the system and iteratively discarding those potential inputs that do not make a significant contribution.

20. The method of claim 19 wherein the importance of each potential input is quantified by calculating the relative importance of the potential inputs.

21. The method of claim 20, and further comprising calculating a normalised value of the relative importance and wherein the normalised value of the relative importance is compared with a threshold value to determine whether to discard a potential input.

22. Computer program code executable by at least a first data processing device to carry out the method of claim 1.

23. At least a first computer readable medium bearing computer program code as claimed in claim 22.

24. A data processing system providing co-operative learning by at least a first entity supporting a first rule based system and a second entity supporting a second rule based system, the data processing system including at least a first data processing device and at least a first storage device in communication therewith and storing instructions which can configure the data processing device to cause:

the first entity to generate a rule base from input data supplied from at least one input and to calculate recursion data which can be used to recursively update the rule base as a result of newly received input data;

the first entity to send rule data defining at least one rule of the rule base of the first entity and associated data, including the recursion data, to the second entity; and the second entity to determine whether to update the rule base of the second entity using the transmitted rule data, and if so then to use the recursion data to recursively determine the updated rules for its rule base.

25. A data processing system as claimed in claim 24, in which the data processing system includes:

a first data processing apparatus which includes the first data processing device and the first storage device and which hosts the first entity;

a second data processing apparatus which includes a second data processing device and second storage device in communication therewith and storing instructions which can configure the second data processing device, and which hosts the second entity.

26. A data processing system as claimed in claim 24, wherein the first data processing apparatus and the second data processing apparatus are separate apparatus and are in communication via a communication link via which the rule data and associated data can be sent between the first entity and the second entity.

27. A data processing system providing machine learning by an entity supporting a rule based system, the data processing system including at least a first data processing device and at least a first storage device in communication therewith and storing instructions which can configure the data processing device to:

receive a time series data item as input;

determine whether a data point for the time series input data item increases or decreases the spatial density for each previously existing rule;

if the data point does increase or decrease the spatial density for every previously existing cluster, then creating a new cluster and associated rule, otherwise, if the data point does not increase the spatial density for every previously existing cluster, or does not decrease the spatial density for every previously existing cluster, then not creating a new cluster; and repeat the method for a next time series data item received.

* * * * *